(12) United States Patent
Baron et al.

(10) Patent No.: US 6,981,671 B1
(45) Date of Patent: Jan. 3, 2006

(54) AIRFRAME STRUCTURE-INTEGRATED CAPACITOR

(75) Inventors: William Baron, Enon, OH (US); Maxwell Blair, Miamisburg, OH (US); Sandra Fries-Carr, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 726 days.

(21) Appl. No.: 10/109,396

(22) Filed: Mar. 28, 2002

Related U.S. Application Data

(60) Provisional application No. 60/279,532, filed on Mar. 28, 2001.

(51) Int. Cl.
*B64D 45/02* (2006.01)
(52) U.S. Cl. ........................... 244/1 A; 244/119
(58) Field of Classification Search ............... 244/1 A, 244/133, 129.1, 119
See application file for complete search history.

(56) References Cited

U.S. PATENT DOCUMENTS

| | | | | |
|---|---|---|---|---|
| 2,436,578 A | * | 2/1948 | Korn et al. ................ | 428/469 |
| 2,639,248 A | * | 5/1953 | Overholt ..................... | 442/45 |
| 4,623,951 A | * | 11/1986 | DuPont et al. .............. | 361/218 |
| 4,755,422 A | * | 7/1988 | Headrick et al. ............. | 442/7 |
| 4,796,153 A | * | 1/1989 | Amason et al. ............. | 361/218 |
| 5,021,283 A | * | 6/1991 | Takenaka et al. ........... | 428/116 |
| 5,111,354 A | * | 5/1992 | Marzi et al. ................ | 361/218 |
| 5,542,624 A | * | 8/1996 | Smith ......................... | 244/1 A |

* cited by examiner

*Primary Examiner*—Tien Dinh
(74) *Attorney, Agent, or Firm*—AFMCLO/JAZ; Gina S. Tollefson; Gerald B. Hollins

(57) ABSTRACT

An energy storage arrangement wherein electrical charge is stored in capacitor elements dispersed throughout, for example, surface structural components of an aircraft. The electrical capacitor elements may involve dielectric material-separated electrical plates comprising the aircraft skin or preferably may involve numerous wire-like cylindrical capacitor elements dispersed within the weaving of the hardened fabric materials used to fabricate the aircraft. Other elements of the aircraft including internal structure and divider members may also be included in the energy storage function. Pulsed use of the stored energy in, for example, directed energy weapons devices are a contemplated application of the invention. The invention may be viewed as a combined employment of aircraft components in both structural and energy storing functions thus enabling a reduction in aircraft payload utilization and space consumption.

11 Claims, 13 Drawing Sheets

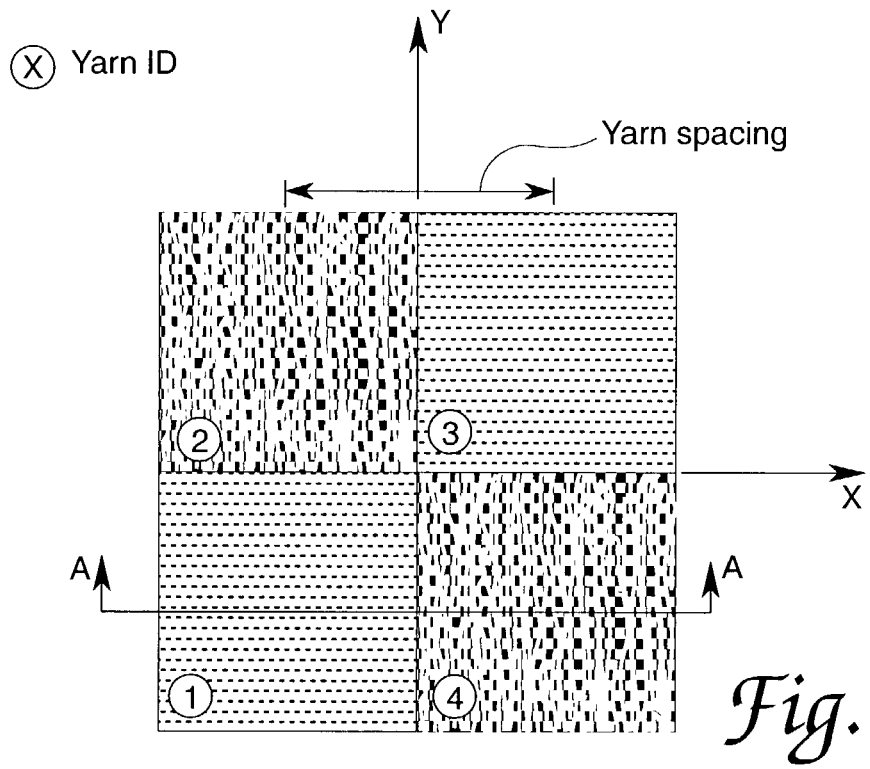
*Fig. 11a*
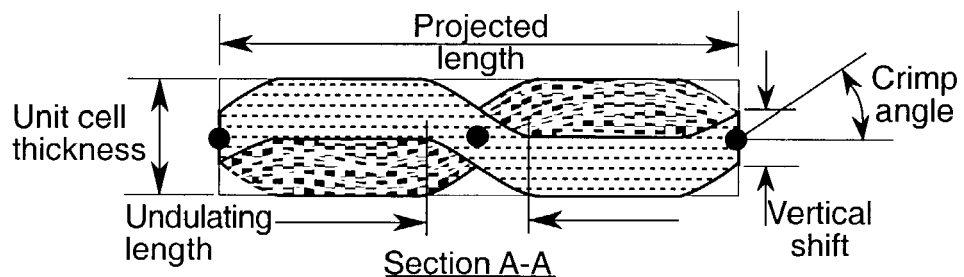
*Fig. 11b*
*Fig. 11*

AIRFRAME STRUCTURE-INTEGRATED CAPACITOR

CLAIM OF PRIORITY

This application claims the benefit of U.S. Provisional Application No. 60/279,532, filed Mar. 28, 2001.

RIGHTS OF THE GOVERNMENT

The invention described herein may be manufactured and used by or for the Government of the United States for all governmental purposes without the payment of any royalty.

BACKGROUND OF THE INVENTION

Several modern day weapon concepts, particularly airborne directed energy weapon programs of interest to the U.S. military, appear to be limited in utility by the existing developmental state of the energy storage electrical capacitor. The relatively large mass and physical size of such capacitors due to their low joules per pound capability—limit the possible fielding/commercialization of large pulsed power, high energy density systems. The present invention is focused on one way in which these limitations may be overcome through an unusual and at first blush radical revisiting of the aircraft materials and aircraft structures arts. The technical concepts used in the present invention may be employed in other pulse and power management applications on board an aircraft or in other settings particularly in the movable vehicle and robotic arts.

The use of electrical conductors in a textile material as comprises a significant part of the present invention has of course been accomplished in several classes of the technical arts for some time. In the electrical heating art as is exemplified by the electrical flying suits of the World War two era and in electric blankets, for example, the enclosing of electrical resistance elements between layers of a textile item is known to have been practiced. Similarly the imbedding of electrical resistance wires in the glass or the plastic intermediate layer of automotive windshield stock has been practiced. The weaving of electrical conductors into the fabric of a material desirably provided with electrical conductivity for the purpose of static electrical discharge reduction is also believed to have been practiced in the hospital and other technical arts. The incorporation of electrical capacitor elements within a woven fabric is however believed to be a less common or even previously unaccomplished occurrence.

SUMMARY OF THE INVENTION

The present invention provides a space and weight saving electrical energy storage arrangement in which portions of an aircraft already needed for structural and aerodynamic purposes are enabled to function as significant electrical energy storing elements of the capacitor type.

It is an object of the present invention therefore to provide an improved arrangement for storing electrical energy within the structural components of an airframe or other structural elements.

It is another object of the invention to use the skin portion of conventional aircraft elements such as fuselage, wing and tail surfaces as energy storing sites in an aircraft.

It is another object of the invention to use the skin portion of conventional aircraft elements such as fuselage, wing and tail surfaces as aircraft-internally accessed electrical energy storing sites for the aircraft.

It is another object of the invention to provide a form of an electrical capacitor that may be easily integrated into the skin surface portions of an aircraft.

It is another object of the invention to provide a form of an electrical capacitor that may be easily integrated into the composite materials fabric skin surface portions of an aircraft.

It is another object of the invention to employ aircraft skin surfaces fabricated from either conventional metallic plate materials or from carbon matrix materials as electrical energy storing sites of the aircraft.

It is another object of the invention to provide a structurally integrated capacitor for an aircraft or other vehicle, a capacitor which may also be used in numerous other settings such as in robotic devices and space applications.

It is another object of the invention to provide a structurally integrated capacitor capable of storing electrical energy for weapons operation or other pulsating loads in an aircraft.

It is another object of the invention to provide materials and techniques usable in a structurally integrated capacitor-inclusive aircraft.

Additional objects and features of the invention will be understood from the following description and claims and the accompanying drawings.

These and other objects of the invention are achieved by the weight conserving and space conserving method of capacitively storing electrical energy within the enclosure of an aircraft airframe, said method comprising the steps of:
fabricating substantial portions of said airframe from structural materials comprised of intimately spaced electrically isolated and electrical capacitance-comprising first and second electrical conductors disposed in a woven fabric;
connecting a plurality of said first electrical conductors to a first common electrical node;
joining a plurality of said second electrical conductors to a second common electrical node;
disposing an electrical capacitance charging electrical potential between said first and second electrical nodes at a capacitor charging rate.

BRIEF DESCRIPTION OF THE DRAWING

The accompanying drawings incorporated in and forming a part of the specification, illustrate several aspects of the present invention and together with the description serve to explain the principles of the invention. In the drawings:

FIG. 11 shows fabric details useful in analyzing present invention fabric for mechanical properties.

DETAILED DESCRIPTION OF THE INVENTION

Figure 1:
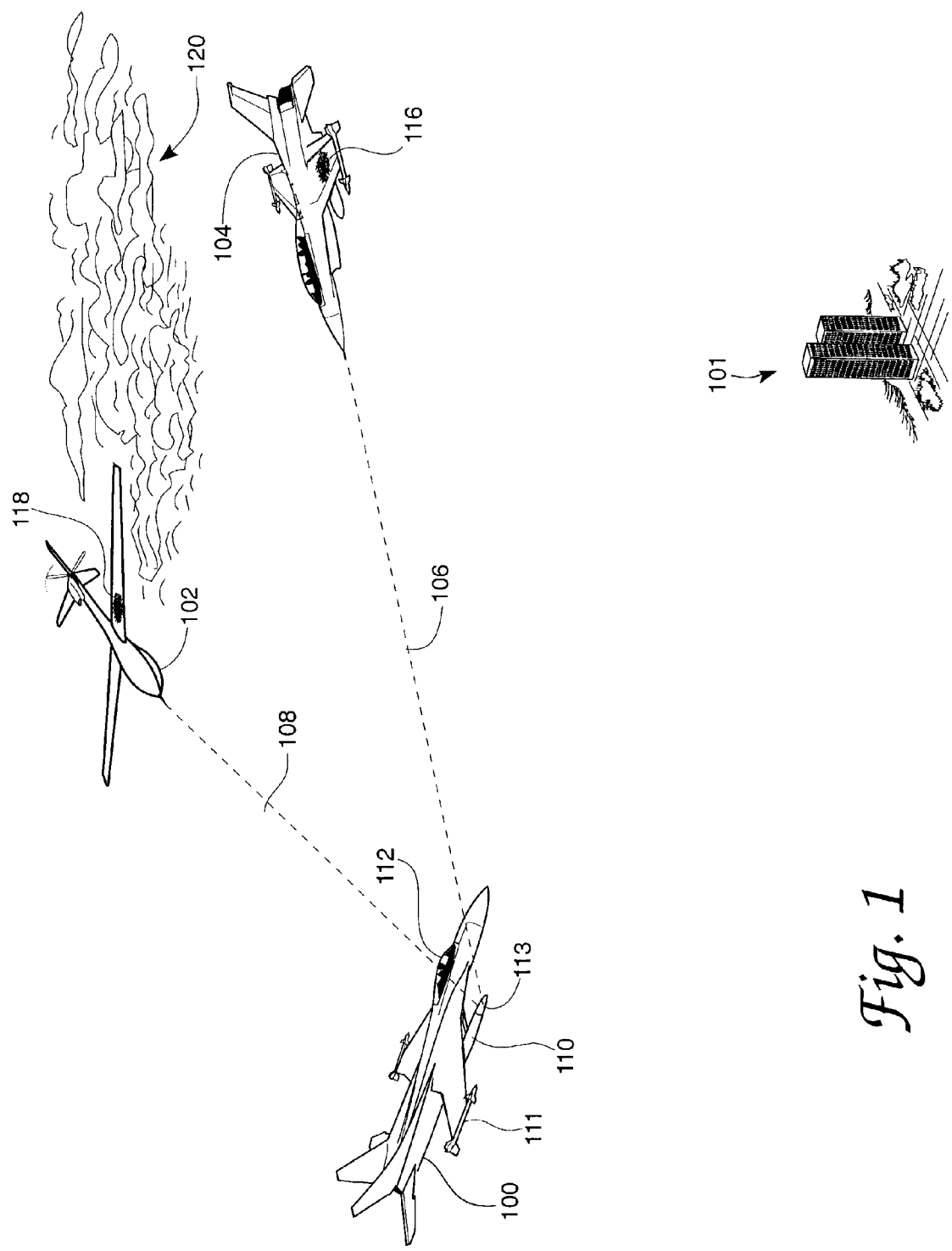
FIG. 1 shows an airborne military encounter in which the present invention may be used.

FIG. 1 in the drawings shows an aircraft combat scene in which an aircraft made according to the present invention may be useful. In the FIG. 1 drawing a hostile aircraft 100 has elected to approach a ground region 101 being protected by two aircraft made in accordance with the present invention. One of the protecting aircraft 104 is illustrated to be of the manned fighter type such as a special version of the F-16 fighter currently used by U.S. and friendly forces. The other of the protecting aircraft at 102 is illustrated to be of the unmanned type such as the Global Hawk unmanned surveillance/weapons carrier aircraft used in Afghanistan and other recent actions undertaken by the U.S. military; the aircraft 102 may have been "parked" or loitering in a cloud formation 120 for example. Each of the protecting aircraft 102 and 104 are represented in FIG. 1 as having established a boresight physical relationship with respect to the hostile aircraft 100, or some of its components such as an input area 113 of the electronics pod 110, a carried weapon 111 or the aircraft crew compartment 112, in order to accomplish some form of disabling weapon deployment toward the aircraft 100.

Notwithstanding significant tactical questions regarding the practicality of or even the possibility of the FIG. 1 scene (and especially the prospect of two diverse speed aircraft each being successful in a concurrent attack against a competent enemy pilot), it is assumed that the weapon being used by each of the protecting aircraft 102 and 104 is of the pulsed energy type as opposed to the more conventional chemically propelled weapon type. The weapons directed along the paths 106 and 108 toward the aircraft 100 or component parts of the aircraft 100 may for example be of the directed pulsed energy type, such as a laser or microwave device or of the electrically propelled railgun type or of other pulsed energy system types. An example of a weapon of the electrically propelled railgun type is to be found in the commonly assigned U.S. patent of David P. Bauer, U.S. Pat. No. 5,375,504. With respect to the present invention it is significant to note that each of these weapon types has need of an electrical energy supply system of significant transient energy delivery capability but of less demanding longer-term average energy accumulating rate capability. In other words each of aircraft 102 and 104 have need of an ability to accumulate electrical energy in some reservoir over an extended time interval and execute delivery this accumulated energy to a load, i.e., to a weapon system, during a much shorter time interval. Accumulation periods of minutes or seconds and delivery periods of milliseconds or microseconds may for example be dictated by the weapon(s) chosen for use in the aircraft 102 and 104. If the weapon received in these aircraft is of the pulsed high energy laser type for example, energy accumulation periods of minutes or seconds are usually involved and energy delivery periods of less than one second are incurred.

Both the energy accumulation and energy delivery portions of this cycle may involve significant electrical currents however, the short energy delivery event is by far the more demanding on the current capabilities of an energy storage system, particularly when this storage system is based on the electrical capacitor. Currents flows of hundreds, thousands or even millions of amperes may be needed to impart the needed electrical, optic or kinetic energy to a weapon of the type contemplated for use in the FIG. 1 scene.

The achievement of energy accumulation and delivery events involving such electrical currents is not accomplished without careful technical consideration under even the most optimum of ground-based laboratory conditions. The accomplishment of such an energy cycle with reliability and within the physical confines of and the weight restrictions of an aircraft, particularly a relatively small aircraft of the types represented in FIG. 1, is indeed a technical challenge. The present invention is believed to provide a fresh approach to resolving this need. The present invention is believed particularly to provide an escape from the aircraft payload-limiting, space and weight-consuming use of banks of discrete electrical capacitors to meet pulsed energy accumulation and delivery needs of these types. By calling on component parts of the host aircraft, the aircraft 102 and 104 in FIG. 1, to perform dual functions, i.e., structural and electrical function duties, the present invention achieves what is believed to be a new threshold in the aircraft and weapons systems arts.

As an initial part of this new threshold in the aircraft and weapons systems arts it may now be appreciated that the aircraft 102 and 104 in FIG. 1 are depicted in the representative areas 116 and 118 to include less conventional skin surface structural components that are made, not of metallic sheet such as aluminum alloy, but are instead fabricated with skin surface components made from treated cloth matrix textiles such as the impregnated carbon—carbon matrix materials or the carbonaceous fiber materials as are used for example in the present generation of U.S. stealth aircraft. The representative areas 116 and 118 of the aircraft 102 and 104 may be considered to extend over part or all of the exterior surface portions of the aircraft and may additionally extend over internal surfaces of at least certain parts of the aircraft as is explained in greater detail in subsequent parts of this document.

In order to appropriately describe the believed new approach to aircraft arrangement represented by the FIG. 1 aircraft 102 and 104 the following description treats at least summarily the electrical, the airframe structural, the weapon system and other aspects of an aircraft combined airframe and structurally integrated capacitor using topic headings as are believed to be helpful in understanding the multiple facets of the invention. The first of these topic headings considers several electrical attributes of a capacitor.

Electrical Background

A conventional capacitor is an electrical circuit element having the ability to store an electrical charge. The current (i) passing through the element is proportional to the derivative of the voltage across it.

$$i = C\frac{dV}{dt} \qquad \text{Equation 1}$$

Solving for the voltage and integrating yields:

$$V = \frac{Q}{C} \qquad \text{Equation 2}$$

The proportionality constant C is the charge storing capacity of the element and is the Capacitance, with Q in units of coulombs and V in volts. The capacitance is thus measured in farads (Reference [1]). A coulomb/volt is equal to one farad. One farad is a large amount of electrical capacitance but not uncommon in electrolytic form. The electronics community typically deals with capacitors of microfarad i.e., uF ($10^{-6}$ Farads) size. Capacitance can be calculated directly if the voltage is known for a given charge. Capacitance charge or energy delivery is characterized by a voltage drop from a higher to lower potential (+ to –); such a voltage drop indicates that energy is being removed from the capacitor and for example stored or dissipated. The power and stored energy for a capacitor may be calculated respectively from the relationships:

$$p = Vi = CV\frac{dV}{dt} \qquad \text{Equation 3}$$

$$w = \int p\,dt = \int CV\frac{dV}{dt}dt = \frac{1}{2}CV^2 \qquad \text{Equation 4}$$

Many physical arrangements of capacitors exist, however only capacitor configurations able to withstand mechanical loads inclusive of shear and bending are viable candidates for the present invention. Mechanical loads of these types commonly appear in numerous locations of an aircraft airframe during its normal usage. Two types of capacitors of possible use in the present invention are therefore the parallel plate capacitor and cylindrical element capacitor (Reference[2]). The parallel plate capacitor consists of two electrical conductor plates separated by a distance, d, in for example a vacuum. The electric field E between the plates of such a capacitor is the charge per unit area, $\sigma$, divided by the permittivity $\epsilon_o$ of free space for a capacitor in a vacuum.

$$E = \frac{\sigma}{\varepsilon_o} \quad \text{where, } \varepsilon_o = 8.85E-12 \; C^2/Nm^2 \qquad \text{Equation 5}$$

The voltage in such a capacitor is equal to the field, E, multiplied by the distance d between the plates. The total charge, Q, on one plate of the capacitor is $\sigma$ multiplied by the area A of the plate. Substituting yields the following relation for the parallel plate capacitance:

$$C = \frac{k\varepsilon_o A}{d} \qquad \text{Equation 6}$$

Where k is the dielectric constant of the dielectric material separating the electrodes.

Notably, it is possible to increase the capacitance in a parallel plate capacitor by increasing the surface area, A, of the electrodes, decreasing the electrode separation, d, and/or increasing the dielectric constant, k. Increasing the area or decreasing the separation in the capacitor has a linear effect on the capacitance that can be attained. Choosing a dielectric material with a high dielectric constant also is related linearly to capacitance and can offer significant improvements in capacitor performance. For instance, a polycarbonate material has a dielectric constant of 3.1 but in some capacitor applications, polyvinylidene fluoride (PVDF), having a dielectric constant of greater than 8.4 is a usable dielectric material. Therefore, PVDF can provide more capacitance, in the same capacitor area with the same separation thickness. Another important factor in the selection of a dielectric material is its voltage breakdown strength, often expressed in kilovolts per mil of thickness, KV/mil. This characteristic determines the maximum voltage that can be applied to a capacitor before electrical breakdown of the dielectric material occurs; this characteristic is measured in volts per unit thickness. Materials that possess a high dielectric constant generally have lower voltage breakdown strength, therefore it becomes necessary to trade between dielectric constant and voltage breakdown strength in capacitors operating at the margin.

Although the parallel plate capacitor is of significant interest with respect to use in the present airframe-capacitor combination invention the dielectric materials presently available for use in this capacitor configuration are less than optimum with respect to mechanical properties such as the shear strength needed in an aircraft structure. This property is further developed in following parts of this specification. For this reason, another form of capacitor, the cylindrical capacitor is considered in addition to the parallel plate capacitor for the present invention. In addition to using the cylindrical capacitor the present invention contemplates incorporation of a plurality of such capacitors into a structurally integrated textile capacitor array.

The cylindrical capacitor uses two curved concentric conductors of radius, a, for the inner cylinder and radius, b, for the outer cylinder and of separation by a dielectric material to establish an electric field between concentric surfaces of the capacitor. To compute the capacitance in such a cylindrical capacitor, a charge (designated as $\lambda$-Q per unit length) is assumed on the inner conductor. The electric field between such cylinders can be found by means of the Gauss law, where a gaussian cylinder of radius r and length d is taken between the cylinders.

$$\int_S E\,dA = \frac{1}{\varepsilon_o}\sum Q \qquad \text{Equation 7}$$

Integrating over the surface area of the cylinder and solving for E, yields:

$$E = \frac{\lambda}{2\pi\varepsilon_o r} \qquad \text{Equation 8}$$

Using this value of E to find the potential difference between the cylinders, and using the definition, $$V = V_{outer} - V_{inner} = -\int_a^b E \, dr \quad \text{Equation 9}$$

The capacitor voltage can then be calculated in terms of the geometrical parameters and the charge λ.

$$V = -\frac{\lambda}{2\pi\varepsilon_o} \ln\frac{b}{a} \quad \text{Equation 10}$$

Using Equation 2 with this relationship for voltage the capacitance per unit length can be calculated.

$$\frac{C}{L} = \frac{2\pi\varepsilon_o}{\ln\left(\frac{b}{a}\right)} \quad \text{Equation 11}$$

This equation can be used to calculate the capacitance of a cylindrical capacitor located in a vacuum. The capacitance of a capacitor in a vacuum $C_v$ is related to a capacitor $C_d$ separated by a dielectric, by the ratio:

$$k = \frac{C_d}{C_v} \quad \text{Equation 12}$$

Where k is again the dielectric constant. In terms of Equation 11, the relation for capacitance in a cylindrical capacitor becomes:

$$\frac{C}{L} = \frac{k 2\pi\varepsilon_o}{\ln(b/a)} \quad \text{Equation 13}$$

In scaling up and delivering higher voltages it is possible to imagine layering cylindrical capacitors one on top of another. For example, if we have two sets of concentric cylinders of increasing radii (a,b,c,d) and with alternating charges +Q, −Q, +Q, −Q. The voltage of each concentric system can then be calculated by using Equation 10, and added to obtain the voltage from a–d as shown in Equation 14.

$$V_{a-d} = -\frac{\lambda}{2\prod \varepsilon_o}\left(\ln\frac{b}{a} + \ln\frac{d}{c}\right) \quad \text{Equation 14}$$

The total capacitance $C = Q/V_{a-d}$ (from Equation 2) can then be calculated using this voltage. The capacitance follows from this as shown in Equation 15.

$$\frac{C}{L} = \frac{k 2 \prod \varepsilon_o}{\ln\frac{b}{a} + \ln\frac{d}{c}} \quad \text{Equation 15}$$

This is the result for 2 cylindrical capacitors in series. The equivalent series capacitance is always less than the smallest capacitance in the chain. However, the voltage scales as $V_{total} = V_1 + V_2 + V_3 + \ldots$ In general, this is how high voltage capacitor devices may be scaled. Capacitor pads are connected in parallel and often released in series. This same concept can be used to power various applications in airborne and space-borne systems.

For a single layer dielectric in a cylindrical capacitor we see that as the dielectric is made thin, b/a approaches 1 and C/L approaches infinity. Of course, there are manufacturing limits on uniform thin coatings and there are limits on the dielectric material to resist the voltage (potential) difference characterized by the voltage break down strength. We also see that for a constant dielectric thickness (b-a), the capacitance C/L approaches infinity as a approaches infinity.

Both the flat plate capacitor and a structurally integrated textile capacitor comprised of cylindrical capacitors connected in array may be used to embody the present invention. In the case of the parallel plate capacitor, laminated structural systems of metal and dielectric material are needed. For this purpose sheets of aluminum bonded to a dielectric material can be used. Manufacturing such a system appears possible because structural precedents such as sheets of aluminum laminated to impregnated Kevlar™ while the material is held under tension have been achieved. One version of this material is known as Arall™: Arall™ is not primarily intended for electrical uses but is often selected for its structural toughness. Use of this laminated concept in the present invention requires laminating the desired aluminum to a good dielectric such as Kapton™. Although this appears to be a reasonable process for present invention usage, it needs significant development to insure a suitable bond between the aluminum and the Kapton™ is achieved. Since Kapton™ alone does not offer significant structural capability, a present invention system requires that the dielectric be reinforced with fibers so that the structural system can react shear loads. Additionally, the present structurally integrated capacitor operational environment presents maintainability issues such as damage tolerance and repair. Since parallel plate capacitors are quite efficient, this concept appears to offer significant potential for added effort.

An alternate to the flat plate capacitor for the present invention is a cylindrical capacitor based arrangement capable of reacting structural loads. In this approach a dielectric coated wire conductor may be coated with a conductive metal layer. This cylindrical capacitor is then integrated into a hybridized composite weave of graphite and the coated wire. This material is then used directly in the primary load carrying members of the aircraft or other vehicle. In this manner the capacitor becomes fully integrated into the structure of the aircraft for example and reacts structural loads, since the dielectric material need not react shear loads independently, as is the case in the parallel plate structurally integrated capacitor. With this approach tens of thousands of feet of capacitor can be integrated into an aircraft structure, moreover, the capacitor elements also assist directly in reacting the structural loads of the airframe.

Cylindrical Capacitor Considerations

Commercially available copper wire with an appropriate gauge to enable weaving may be used to consider a capacitor of this type. Pulse power capacitors are most efficient when the voltage breakdown strength of the dielectric material is maximized. This is due to the energy stored being proportional to the square of the voltage breakdown strength ($E = \frac{1}{2}CV^2$). Polypropylene may be used as a dielectric material in such a capacitor, however, the availability of an alternate commercial product and the difficulty of coating a copper wire with this material and a surrounding metal jacket suggest use of an available alternative aromatic polyimide material, Kapton™. Kapton™ provides a breakdown strength of approximately 7000 volts/mil with a dielectric constant of four. Superior dielectric materials such as the emerging Fluorene Polyester (FPE) or Diamond Like Coating (DLC) thin film materials may be used in place of Kapton™ where the voltage breakdown strength of these new materials approach 20 KV/mil, as shown in Table 1 below. A number of other dielectric materials are in fact considered possible candidates or starting point materials for use in capacitors made according to the present invention. These materials include polycarbonate, polyvinylidene fluoride, polypropylene, polyimide, aromatic polyimide, polyester, fluorene polyester, polyurethane, polyesterimide, polyamideimide silicon carbide and aerogel. Such materials may be used alone or augmented with other materials in capacitors made in accordance wit the invention.

TABLE 1

Properties of Dielectric Materials

| Material | Tensile | D.C. | Mod. of Elasticity (100 Kpsi) | Breakdown Strength (V/mil) | DF |
|---|---|---|---|---|---|
| Polycarbonate: | 12 | 2.8 | 4.35 | 4,800 | 0.12 |
| Polypropylene: | 41 | 2.2 | 2.90 | 4,000 | <0.01 |
| PVF: | 16 | 7.8 | 3.23 | 2,500 | 1.60 |
| Polysulfone: | 8.50 | 3.48 | 3.10 | 3,500 | 0.28 |
| FPE | 70 MPa | 3.5 | 2 GPa | 12,000 | <0.01 |
| Kapton-H | 25 Kpsi | 3.5 | 4.3 | 7,000 | 0.25 |

26-gage Kapton™ coated copper magnet wire is available commercially from one or more wire manufacturers and can be obtained for example from S & W Wire Company of 45A Progress Avenue, Cranberry Township, Pennsylvania, USA, 16066-1608, telephone (724) 772 0049. This wire may be covered with an outer conductor material to provide a test capacitor sample usable in present invention structurally integrated capacitors. To form the outside conductor of the test capacitor, four methods may be considered, including: 1) bonding a metal foil to the dielectric coated wire, 2) electro-less plating the wire, 3) flame spraying a metal coating over the wire, and 4) a conductive paint dispersible by spray, vapor deposit or painting onto the surface of the wire. For investigation purposes the painting option may be used, for a mass-produced product, method number two or three may be more feasible.

Test Capacitor Configuration 26-gauge (4.04E-4 meters) Kapton™ wire provides a minimum dielectric capability of 1000 volts/mil. Again, added capability can be gained with the use of superior dielectrics over that of Kapton™ in the same configuration. The thickness of the acquired 26-gauge wire with a Kapton™ layer taken at four different places along the wire shows an average thickness of 5.69E-4 meters.

The conductive paint used to form a test capacitor may be a silver-coated copper conductive paint, with a loading specification of 15–20% copper with an alcohol VOC. This material may be painted with a brush or applied with an atomized spray for a more uniform coating. Such paint may be procured from Spraylot Corporation, of Mount Vernon, N.Y., telephone (914) 699-3030. This material is advertised as offering a conductive coating that is hard, tough, durable, with excellent adhesion to plastic substrates and is designed with a fast drying solvent blend desirable for high volume production. Thus, this material appears to provide the flexibility and wear resistance needed during a weaving process. The paint may be applied to the Kapton™ wire using a brush since with respect to electrical parameters, in view of Equation 11 the overall capacitance is not directly affected by coating thickness variations but only by the radius of the inner conductor and the radius to the outside of the Kapton™ layer.

The wire may be coated with the conductive paint on a portion of about 0.4064 meters length. The paint remains slightly pliable after curing and offers good adhesive strength and peeling resistance even after repeated bends to demonstrate its durability. From Equation 13 and the following parameters the capacitance of this wire may be estimated:

Parameters:
L10.4046 meters
a=2.02E-4 meters
b=2.85E-4 meters
k=4

Capacitance: C=262.60 picofarads

The energy stored in a capacitor is predicted by the relationship $E=CV^2$, therefore for a one wire capacitor E=20uJ at a voltage of 400V. If the wire length is made much greater, the capacitance will increase proportionally. Therefore, if the length is increased to 1000 meters, the capacitance becomes 0.6 uF and E=0.05J. If these wires are then connected in series the individual wire voltages will add, and one can see how high voltage, and significant energy storage capability may be achieved with the present invention combined capacitor and aircraft structure. Since the dielectric thickness in the 'wires' of such capacitors will be rather thin the use of high voltage breakdown materials such as FPE or DLC is desirable so that the energy storage capability, as governed by the square of the operating voltage, is maximum Cylindrical Capacitor Evaluation An HP 4284A Precision LCR meter capable of applying a voltage and measuring the capacitance while sweeping a frequency spectrum may be used to evaluate an achieved cylindrical capacitor. The results of such test are shown in Table 2 below.

TABLE 2

Frequency Sweep of Cylindrical Capacitor

Data File D\CAPDAS_DATA\LCR_DATA\2000_08_10\KAPTON_WIRE
Capacitor Material Polymer
Manufacturer WILLIAM BARON
Characterization Type frequency
Oscillator Type Voltage 1 000000
Bias Type None
Averaging Number 10

| FREQUENCY | CAPACITANCE | DISSIPATION | PARALLEL (Rp) | SERIES (Rs) | ESR | INDUCTANCE | CONDUCTANCE | REACTANCE | IMPEDANCE | QUALITY |
|---|---|---|---|---|---|---|---|---|---|---|
| 20 | 2.05E-10 | 9.15E-03 | 4.47E+09 | 3.07E+05 | 6.47E+05 | -3.10E+05 | -3.89E+07 | 2.16E-10 | 3.90E+07 | 1.02E+02 |
| 25 | 2.05E-10 | 7.86E-03 | 3.72E+09 | 2.51E+05 | 5.11E+05 | -1.98E+05 | -3.11E+07 | 2.59E-10 | 3.11E+07 | 1.19E+02 |

TABLE 2-continued

Frequency Sweep of Cylindrical Capacitor

Data File D:\CAPDAS_DATA\LCR_DATA\2000_08_10\KAPTON_WIRE  
Capacitor Material Polymer  
Manufacturer WILLIAM BARON  
Characterization Type frequency  
Oscillator Type Voltage 1 000000  
Bias Type None  
Averaging Number 10

| FREQUENCY | CAPACITANCE | DISSIPATION | PARALLEL (Rp) | SERIES (Rs) | ESR | INDUCTANCE | CONDUCTANCE | REACTANCE | IMPEDANCE | QUALITY |
|---|---|---|---|---|---|---|---|---|---|---|
| 30 | 2.05E−10 | 8.45E−03 | 3.13E+09 | 2.03E+05 | 4.18E+05 | −1.37E+05 | −2.59E+07 | 3.41E−10 | 2.59E+07 | 1.19E+02 |
| 40 | 2.05E−10 | 6.81E−03 | 2.27E+09 | 1.23E+05 | 2.88E+05 | −7.72E+04 | −1.94E+07 | 3.44E−10 | 1.94E+07 | 1.45E+02 |
| 50 | 2.05E−10 | 7.56E−03 | 2.04E+09 | 1.16E+05 | 2.34E+05 | −4.95E+04 | −1.55E+07 | 4.94E−10 | 1.55E+07 | 1.33E+02 |
| 60 | 2.04E−10 | 5.94E−03 | 1.31E+09 | 7.89E+04 | 2.06E+05 | −3.43E+04 | −1.30E+07 | 4.37E−10 | 1.29E+07 | 1.70E+02 |
| 80 | 2.05E−10 | 7.43E−03 | 1.30E+09 | 7.30E+04 | 1.46E+05 | −1.93E+04 | −9.72E+06 | 7.57E−10 | 9.72E+06 | 1.36E+02 |
| 100 | 2.04E−10 | 7.20E−03 | 1.09E+09 | 5.55E+04 | 1.11E+05 | −1.24E+04 | −7.79E+06 | 9.26E−10 | 7.79E+06 | 1.39E+02 |
| 120 | 2.04E−10 | 7.23E−03 | 8.97E+09 | 4.73E+04 | 9.43E+04 | −8.61E+03 | −6.49E+06 | 1.12E−09 | 6.49E+06 | 1.33E+02 |
| 150 | 2.04E−10 | 7.09E−03 | 7.30E+09 | 3.73E+04 | 7.43E+04 | −5.51E+03 | −5.19E+06 | 1.35E−09 | 5.20E+06 | 1.40E+02 |
| 200 | 2.04E−10 | 7.06E−03 | 5.55E+08 | 2.75E+04 | 5.49E+04 | −3.10E+03 | −3.90E+06 | 1.80E−09 | 3.90E+06 | 1.41E+02 |
| 250 | 2.04E−10 | 6.99E−03 | 4.45E+08 | 2.19E+04 | 4.38E+04 | −1.99E+03 | −3.12E+06 | 2.25E−09 | 3.12E+06 | 1.43E+02 |
| 300 | 2.04E−10 | 6.91E−03 | 3.75E+08 | 1.79E+04 | 3.60E+04 | −1.38E+03 | −2.60E+06 | 2.65E−09 | 2.60E+06 | 1.45E+02 |
| 400 | 2.03E−10 | 6.93E−03 | 2.81E+08 | 1.36E+04 | 2.72E+04 | −7.78E+02 | −1.96E+06 | 3.55E−09 | 1.96E+06 | 1.44E+02 |
| 500 | 2.03E−10 | 6.95E−03 | 2.25E+08 | 1.09E+04 | 2.18E+04 | −4.98E+02 | −1.57E+06 | 4.44E−09 | 1.57E+06 | 1.43E+02 |
| 600 | 2.03E−10 | 6.94E−03 | 1.89E+08 | 9.04E+03 | 1.81E+04 | −3.40E+02 | −1.31E+06 | 5.32E−09 | 1.31E+06 | 1.44E+02 |
| 800 | 2.03E−10 | 6.87E−03 | 1.42E+08 | 6.75E+03 | 1.35E+04 | −1.95E+02 | −9.81E+05 | 7.02E−09 | 9.81E+05 | 1.45E+02 |
| 1000 | 2.03E−10 | 6.78E−03 | 1.16E+08 | 5.32E+03 | 1.07E+04 | −1.25E+02 | −7.85E+05 | 8.63E−09 | 7.85E+05 | 1.47E+02 |
| 1200 | 2.03E−10 | 6.74E−03 | 9.70E+07 | 4.42E+03 | 8.84E+03 | −8.69E+01 | −6.55E+05 | 1.03E−08 | 6.55E+05 | 1.48E+02 |
| 1500 | 2.02E−10 | 6.73E−03 | 7.79E+07 | 3.53E+03 | 7.06E+03 | −5.56E+01 | −5.24E+05 | 1.28E−08 | 5.24E+05 | 1.49E+02 |
| 2000 | 2.02E−10 | 6.69E−03 | 5.89E+07 | 2.63E+03 | 5.27E+03 | −3.13E+01 | −3.94E+05 | 1.70E−08 | 3.94E+05 | 1.50E+02 |
| 2500 | 2.02E−10 | 6.64E−03 | 4.75E+07 | 2.09E+03 | 4.19E+03 | −2.01E+01 | −3.15E+05 | 2.10E−08 | 3.15E+05 | 1.51E+02 |
| 3000 | 2.02E−10 | 6.63E−03 | 3.97E+07 | 1.74E+03 | 3.49E+03 | −1.40E+01 | −2.63E+05 | 2.52E−08 | 2.63E+05 | 1.51E+02 |
| 4000 | 2.02E−10 | 6.58E−03 | 3.00E+07 | 1.30E+03 | 2.60E+03 | −7.86E+00 | −1.97E+05 | 3.33E−08 | 1.97E+05 | 1.52E+02 |
| 5000 | 2.01E−10 | 6.61E−03 | 2.39E+07 | 1.05E+03 | 2.09E+03 | −5.03E+00 | −1.58E+05 | 4.18E−08 | 1.58E+05 | 1.51E+02 |
| 6000 | 2.01E−10 | 6.66E−03 | 1.98E+07 | 8.77E+02 | 1.76E+03 | −3.50E+00 | −1.32E+05 | 5.04E−08 | 1.32E+05 | 1.50E+02 |
| 8000 | 2.01E−10 | 6.73E−03 | 1.47E+07 | 6.65E+02 | 1.33E+03 | −1.97E+00 | −9.90E+04 | 6.79E−08 | 9.90E+04 | 1.49E+02 |
| 10000 | 2.01E−10 | 6.82E−03 | 1.16E+07 | 5.41E+02 | 1.08E+03 | −1.26E+00 | −7.93E+04 | 8.61E−08 | 7.93E+04 | 1.47E+02 |
| 12000 | 2.01E−10 | 6.92E−03 | 9.55E+06 | 4.57E+02 | 9.15E+02 | −8.77E−01 | −6.61E+04 | 1.05E−07 | 6.61E+04 | 1.45E+02 |
| 15000 | 2.00E−10 | 7.13E−03 | 7.43E+06 | 3.77E+02 | 7.55E+02 | −5.62E−01 | −5.29E+04 | 1.35E−07 | 5.29E+04 | 1.40E+02 |
| 20000 | 2.00E−10 | 7.43E−03 | 5.35E+06 | 2.95E+02 | 5.91E+02 | −3.16E−01 | −3.97E+04 | 1.87E−07 | 3.97E+04 | 1.35E+02 |
| 25000 | 2.00E−10 | 7.81E−03 | 4.08E+06 | 2.48E+02 | 4.97E+02 | −2.03E−01 | −3.18E+04 | 2.45E−07 | 3.18E+04 | 1.28E+02 |
| 30000 | 2.00E−10 | 8.07E−03 | 3.29E+06 | 2.14E+02 | 4.28E+02 | −1.41E−01 | −2.65E+04 | 3.04E−07 | 2.65E+04 | 1.24E+02 |
| 40000 | 2.00E−10 | 8.72E−03 | 2.28E+06 | 1.74E+02 | 3.48E+02 | −7.93E−02 | −1.99E+04 | 4.38E−07 | 1.99E+04 | 1.50E+02 |
| 50000 | 1.99E−10 | 9.38E−03 | 1.70E+06 | 1.50E+02 | 2.99E+02 | −5.08E−02 | −1.60E+04 | 5.87E−07 | 1.60E+04 | 1.07E+02 |
| 60000 | 1.99E−10 | 9.99E−03 | 1.33E+06 | 1.33E+02 | 2.66E+02 | −3.53E−02 | −1.33E+04 | 7.50E−07 | 1.33E+04 | 1.00E+02 |
| 80000 | 1.99E−10 | 1.12E−02 | 8.88E+05 | 1.12E+02 | 2.25E+02 | −1.99E−02 | −9.99E+03 | 1.13E−06 | 9.99E+03 | 8.89E+01 |
| 100000 | 1.99E−10 | 1.25E−02 | 6.43E+05 | 9.96E+01 | 1.99E+02 | −1.27E−02 | −8.00E+03 | 1.56E−06 | 8.00E+03 | 8.04E+01 |
| 120000 | 1.99E−10 | 1.37E−02 | 4.88E+05 | 9.13E+01 | 1.83E+02 | −8.85E−03 | −6.67E+03 | 2.05E−06 | 6.67E+03 | 7.31E+01 |
| 150000 | 1.99E−10 | 1.55E−02 | 3.45E+05 | 8.27E+01 | 1.66E+02 | −5.67E−03 | −5.34E+03 | 2.90E−06 | 5.34E+03 | 6.46E+01 |
| 200000 | 1.98E−10 | 1.84E−02 | 2.18E+05 | 7.38E+01 | 1.48E+02 | −3.19E−03 | −4.01E+03 | 4.58E−06 | 4.01E+03 | 5.44E+01 |
| 250000 | 1.98E−10 | 2.13E−02 | 1.51E+05 | 6.84E+01 | 1.37E+02 | −2.05E−03 | −3.21E+03 | 6.62E−06 | 3.21E+03 | 4.70E+01 |
| 300000 | 1.98E−10 | 2.42E−02 | 1.11E+05 | 6.47E+01 | 1.29E+02 | −1.42E−03 | −2.68E+03 | 9.02E−06 | 2.68E+03 | 4.14E+01 |
| 400000 | 1.98E−10 | 2.99E−02 | 6.73E+04 | 6.02E+01 | 1.20E+02 | −8.01E−04 | −2.01E+03 | 1.49E−05 | 2.01E+03 | 3.34E+01 |
| 500000 | 1.97E−10 | 3.55E−04 | 4.54E+04 | 5.72E+01 | 1.14E+02 | −5.13E−04 | −1.61E+03 | 2.20E−05 | 1.61E+03 | 2.82E+01 |
| 600000 | 1.97E−10 | 4.12E−02 | 3.26E+04 | 5.53E+01 | 1.11E+02 | −3.57E−04 | −1.34E+03 | 3.06E−05 | 1.34E+03 | 2.43E+01 |
| 800000 | 1.97E−10 | 5.25E−02 | 1.92E+04 | 5.29E+01 | 1.06E+02 | −2.01E−04 | −1.01E+03 | 5.20E−05 | 1.01E+03 | 1.91E+01 |
| 1000000 | 1.97E−10 | 6.38E−02 | 1.27E+04 | 5.14E+01 | 1.03E+02 | −1.29E−04 | −8.06E+02 | 7.87E−05 | 8.08E+02 | 1.57E+01 |

The level of capacitance observed in the first fabricated cylindrical capacitor is significant given a limited opportunity to optimize the electrical performance of the system. The experimental sample yields a measured capacitance of approximately 78% of the calculated value. Therefore, it can be presumed that by improving the quality of the capacitor and with an enhanced dielectric selection, a major opportunity exists for improvement in the overall capacitor performance and energy storage capability of the test capacitor. The dielectric material used (Kapton™) is not optimized for capacitor applications but for wire insulation. However, the first achieved capacitor shows stable capacitance over the entire frequency range and the dissipation factor (DF) is within an acceptable range for some capacitor applications. It is believed the dissipation factor can be reduced greatly with proper material selection and better outer conductor coating techniques. The result obtained with this initial capacitor is seen as proving the viability of the present invention combined capacitor and aircraft structure concept.

Figure 2:
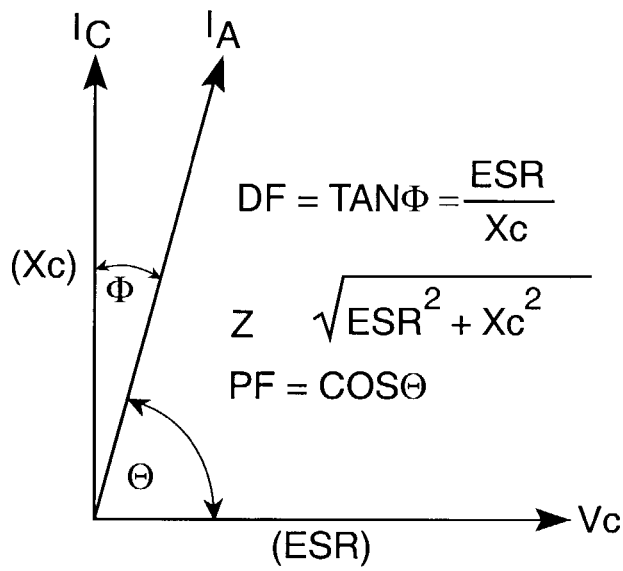
FIG. 2 shows certain electrical characteristics of a capacitor.

A phase relationship exists between capacitor voltage and current as well as Dissipation Factor (DF), Equivalent Series Resistance (ESR), and impedance magnitude (Reference 1). The dissipation factor, and the voltage breakdown strength in a capacitor are generally the most important parameters when designing capacitors for use in military applications. The dissipation factor is equal to the loss tangent of a capacitor's dielectric. This loss is in the form of heat in the capacitor. The loss tangent is dependent on the formulation of the dielectric, the level of impurities, and includes microstructural factors such as grain size, morphology and density. The ESR is equal to the sum of the series resistance, $R_S$ and the parallel resistance, $R_p$. The $R_p$ is dominant at low frequencies and the $R_S$, dominates at high frequencies. This resistance represents the power loss or heating of the capacitor when alternating current is applied. Two other important parameters that characterize the performance of a capacitor are the Quality Factor (QF) and the capacitive reactance $X_c$, which is a measure of the capacitor's resistance to storing energy. However, the capacitive reactance is the non-heating or energy storage component of the capacitor. With sinusoidal or other undulating energization in the ideal capacitor, the current leads the voltage by 90°, but in reality the actual current ($I_A$) lags the voltage by the angle characterized by the loss tangent. The phase relationship linking these characteristics is shown in FIG. 2 of the drawings. These properties are related by the equations presented in Table 3 below.

TABLE 3

Relationship Between Capacitor Parameters

| ESR = | QF = | DF = | Xc = |
|---|---|---|---|
| Xc * DF | 1 / DF | 1 / QF | 1 / (2π * F * C) |
| Xc / QF | Xc / ESR | ESR / Xc | ESR / DF |
| Xc * tanφ | 1 / tanφ | tanφ | ESR * QF |

Figure 3:
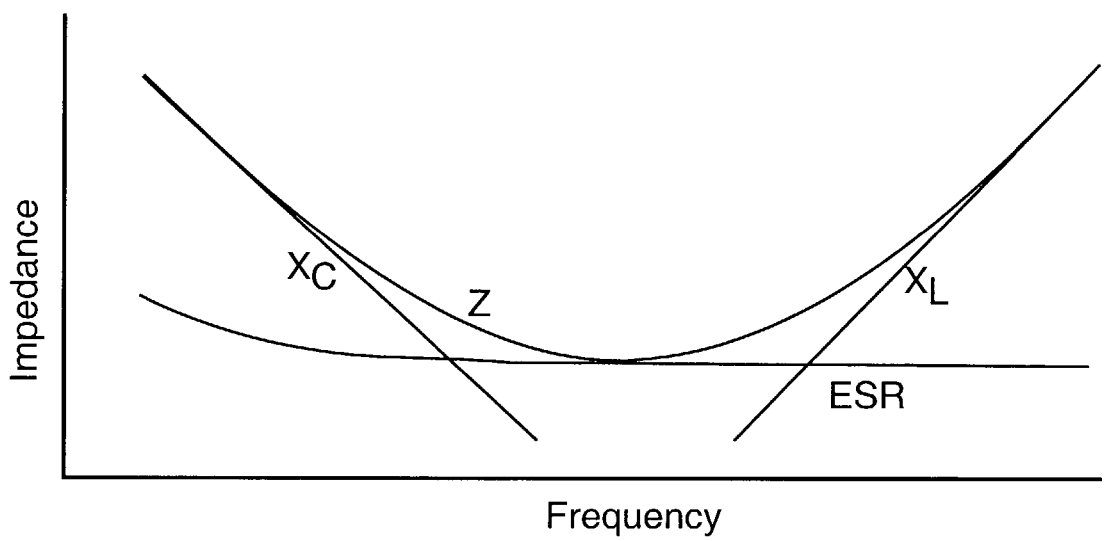
FIG. 3 shows additional electrical resonance related characteristics of a capacitor.

The inductive reactance of an inductor is defined as $X_L = 2\pi FL$ where $X_L$ is in ohms, F is the frequency in Hertz, and L is the inductance in Henrys. The value of L is quite small in most capacitors. If the impedance of the capacitor is plotted as a function of frequency, it will take the form of a wide U shape. The capacitive reactance $X_c$ decreases with increasing frequency, the inductive reactance $X_L$ increases with increasing frequency and the ESR varies only very slowly with frequency. The frequency at which $X_c$ and $X_L$ cross is referred to as the frequency of series resonance. This is shown in FIG. 3 of the drawings. In order to observe these relationships and the associated performance of the present invention wire test capacitor, the data recorded may be normalized by measurement of the greatest absolute magnitude for each data series and plotted against each of the frequencies evaluated. These normalized curves are plotted in FIG. 4 of the drawings herein.

Figure 4:
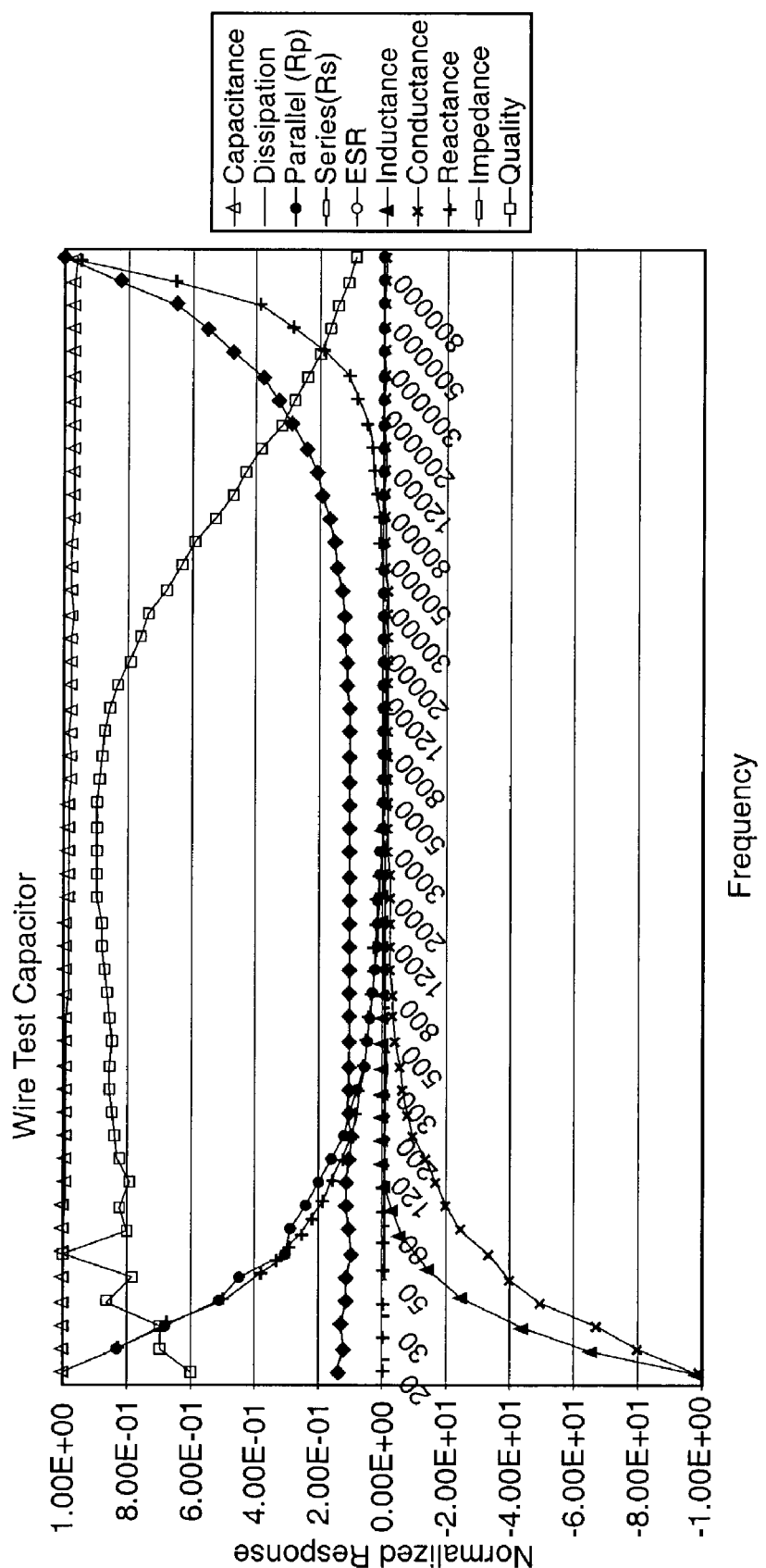
FIG. 4 shows additional electrical resonance related characteristics of a test capacitor relating to the present invention.

The FIG. 4 plot shows that the capacitance of the present invention test capacitor is relatively stable across the frequency spectrum tested, with a negligible decrease at the upper frequencies measured. The dissipation factor of the capacitor shows a decline that is generally consistent with the inverse of the quality factor as the phase relationship indicates it should. The test capacitor shows a fairly good (and stable) dissipation factor at lower frequencies but this increases unacceptably at frequencies above 120 KHz. It is believed this can be improved dramatically with attention to cleanliness, the use of capacitor-grade dielectric materials and improved metal conductor coating procedures. Fabrication of capacitor wires in a clean environment will reduce particulate contamination within the dielectric material. The ESR shows that the dielectric loss is dropping off with frequency, however at 1 MHz (maximum frequency evaluated) no significant increase in ESR is observed. This is to be expected since losses from the dielectric/packaging/metal do not become significant until frequencies of around 300 MHz are reached. Even then, the magnitude of the ESR is generally observed to be around 20% of the value recorded at 1 MHz. At 1 MHz metal losses typically represent around 5% of the ESR. In developing a capacitor for high values of capacitance it is desirable to maximize the series resistance and minimize the parallel resistance. The parallel resistance represents resistive losses outside of the capacitor circuit, and by minimizing the series resistance the capacitor will achieve a low Z value. In the fabricated capacitor it is clear that the parallel resistance is much higher than is desirable. In addition, the inductance represents energy used to develop an electromagnetic field and not being used by the capacitor (a parasitic), which is also quite large as is evidenced by the test data.

A DC insulation resistance/leakage current test may also be performed. In this test a set of sixty samples yield an average Insulation Resistance (IR) of 2.66E13 ohms and a leakage current of 3.79E-13 amps, when tested at 10 volts. This is a good result and it is very likely that it can be increased further, possibly to the order E14, E15 or even E16. Most polymers currently run from E14 to E16. Ceramic dielectrics typically have an IR on the order of E9 to E11. Insulation resistance is a measure of the capacitor's ability to retain an electrical charge for an extended period of time. The higher this value, the better the capacitor. Insulation resistance is determined by dividing the applied voltage across the terminals by the steady state current continuing to flow into the capacitor after charging to the test voltage. At that time the capacitor electrically appears as an ideal capacitor (one with no steady-state current) in parallel with a high resistance resistor. The insulation resistance of most electrostatic capacitors decreases (i.e., degrades) with an increase in temperature. Kapton™ is not the optimal material for a capacitor device, but is not altogether bad in this respect. The capacitor device made and tested above originates with the wiring industry and not the capacitor industry. Therefore, stringent controls and procedures necessary for a superior product were absent. Substantial improvements can be achieved using capacitor grade dielectric materials such as FPE or DLC, and with attention to cleanliness during manufacturing procedures.

Concept Scale-Up

In order to demonstrate that the test fabricated cylindrical capacitor can be scaled-up into an actual structure suitable for use in an aircraft airframe the cylindrical capacitor elements can be integrated into a sample of carbonaceous or graphite fabric material for structural application. This activity should demonstrate two primary considerations: 1) show that conductivity of surrounding graphite does not disrupt capacitor to an appreciable degree and 2) show that cylindrical capacitor integration into a fabric weaving process is viable. These goals may be achieved by a fabricated experimental piece of fabric, a piece of fabric that also illuminates the sensitivities to be expected in the manufacture of the combined capacitor and aircraft structure. A small weaving machine fabricated for this purpose enables manufacture of the fabric sample or coupon inclusive of the capacitor elements. Cylindrical capacitor elements fabricated with greater quality control using a spraying operation to maintain an improved coating thickness are embodied in this sample.

Capacitor Fabrication

Fabricating a piece of airframe structure with the integrated capacitor requires a larger amount of capacitive wire be fabricated. For example, a square foot of plain weave fabric with each yarn (tow) placed on 0.10-inch centers with 25% fiber content made from capacitive wire requires 144 feet of cylindrical capacitor be fabricated. Painting this amount of material by hand is not feasible nor is the quality acceptable for investigation. Therefore, a wooden frame spraying operation may be used to ensure a fairly uniform coat of copper paint is achieved. With conductive paint sprayed with a hand held spray atomized at 40 psi. a visibly uniform and consistent surface is achieved. The average diameter of the capacitor thus achieved is 6.6401E-4 meters. This measurement is the average of eight random sample locations along the sprayed wire.

Weaving Machine

Figure 5:
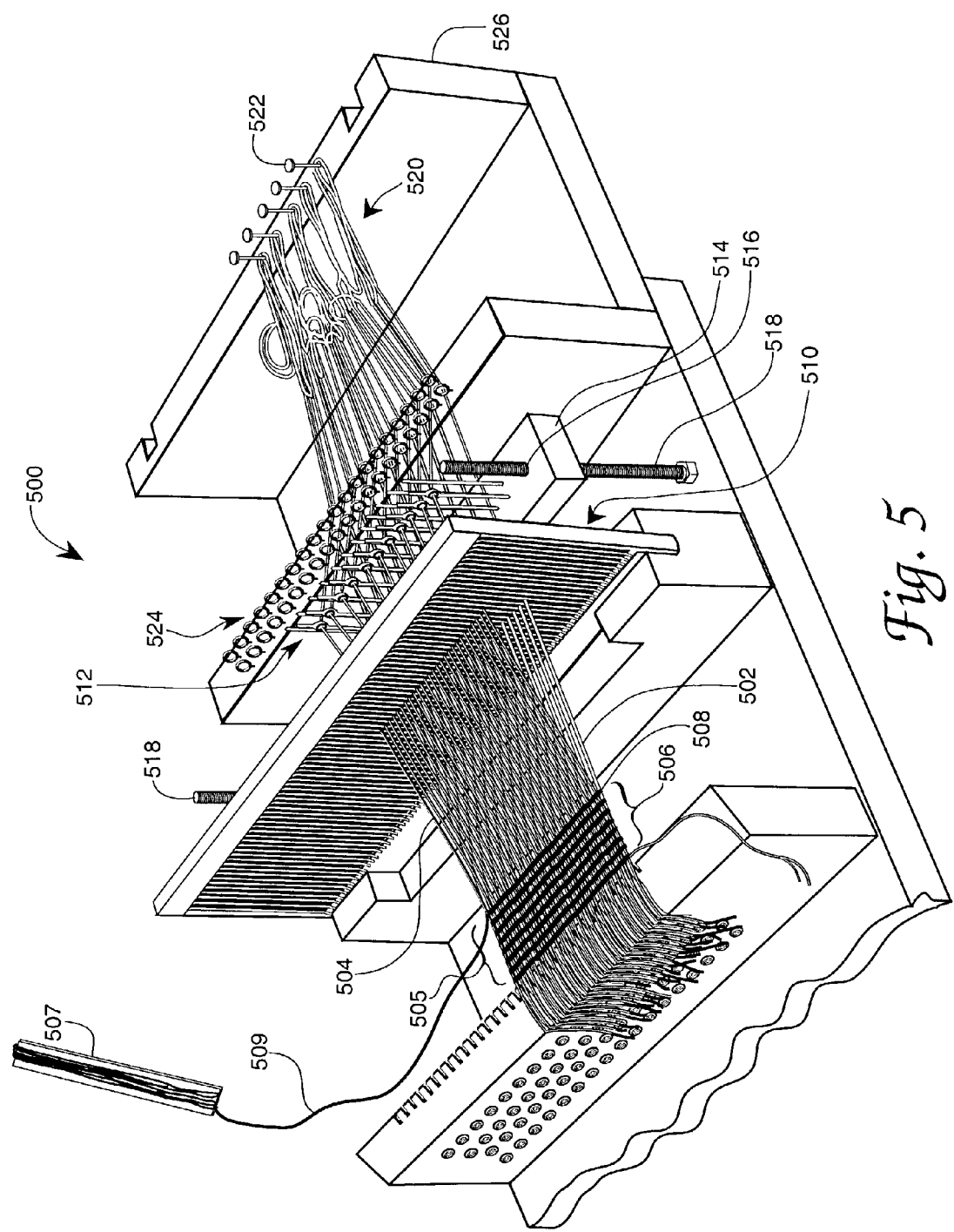
FIG. 5 shows a laboratory weaving apparatus usable to achieve fabric samples relating to the present invention.
Figure 6:
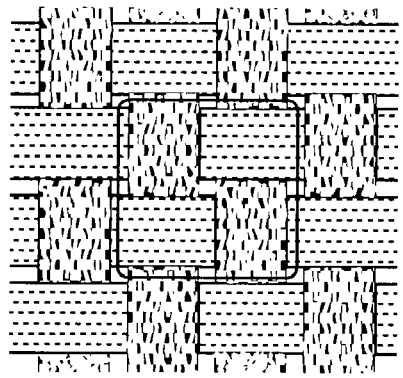
FIG. 6 shows a repeating unit cell of a fabric sample made in accordance with the present invention.

A laboratory-fabricated weaving machine capable of producing a plain weave material 8.0 inches wide by 14 inches long may be used to provide a fabric test sample suitable for evaluation for use in an airframe. Such a weaving machine is shown at 500 in FIG. 5 of the drawings herein. The plain weave desirably achieved with a machine of this type is characterized by a fabric structure wherein each of the warp (direction of the weave) yarns alternately cross each of the fill (direction transverse of the weave) yarns as is shown in FIG. 6 of the drawings. The FIG. 6 unit cell represents the minimal geometry of the structure that repeats itself throughout the fabric of a present invention embodiment.

The graphite material chosen for the fabric test sample is AS4 fiber supplied by Hexcel Corporation, of worldwide locations including Anderson, South Carolina, and Dublin, California, in for example a 12K tow. For a compact plain weave with this material it desired that the tows be located on 0.10-inch centers. Therefore, for a material width of 8.0 inches 80 warp tows are needed. In the laboratory weaving machine 500, the even warp tows 502 in FIG. 5, are held fixed while the odd warp tows 504 in FIG. 5 are allowed to move transverse to the plane 506 of the fabric material 505 (i.e., between upper and lower positions) during the weaving operation. This allows all of the odd warp tows 504 to be placed above the fabric plane 505 to enable passing a shuttle carrying a tow quill 507 and the fill tow 509 between the even and odd warp tows. Then, the odd warp tows, or odd warps, 504 are moved below the even warps 502 and the shuttle is then passed through in the reverse direction. In this manner all of the transverse fill tows 508 are introduced into the woven fabric.

It is desired to fabricate a fabric test capacitor specimen with 25 percent of the tows made from cylindrical capacitor elements. To accomplish this the fixed even warp tows as represented at 502 in FIG. 5 may consist of an appropriate mixture and pattern of cylindrical capacitor wire elements and graphite fiber tows. The reed shown at 510 in the FIG. 5 drawing allows all of the warp tows, even and odd, to pass through on 0.10-inch centers. The purpose of the reed 510 is to provide the ability to maintain the proper width of the fabric and to pack the tows tightly after each pass of the shuttle.

In order to move the odd warp tows up-and-down in the laboratory weaving machine these tows are passed through the eye of 2 inch No. 16 needles 512, which are fixed into a piece of wood 514. This wood 514 provides the function of a harness in a commercial weaving machine. The transverse motion of the weaving is enabled by drilling two ⅜-inch diameter holes 516 in the harness wood 514 positioned so that the harness wood 514 can travel on two ½-inch, ⅜-inch diameter bolts 518 installed in the main frame of the machine.

It is desirable to maintain a tight weave during the fabrication process, since the density of the weave affects the fiber volume fraction and ultimately the strength and stiffness properties of the material. In order to do this, the tension on the tows should be maintained consistently during the weaving process. If the tension fluctuates not only will this prevent the fabric from packing tightly it can also cause the fabric to "cup" after removal from the loom. To maintain tension on the odd tows 504 rubber bands are shown at 520 in FIG. 5, one band on each tow, and four rubber bands to a tie down screw at 522.

In the laboratory weaving machine 500 the tie-down could be initially placed below the screw eyes 524 that the tow passes through after going through the eyes of the needles 512. This requires that the tows be dragged through a 90° turn before being attached to the rubber bands. As a result of the transverse harness movement it is found however that tows can be torn as they passed through the screw eyes. To solve this problem a tailpiece 526 may be placed on the back of the loom and the rubber bands attached directly inline behind the screw eyes to minimize any abrasion that occurs. In addition, it is found that spraying the tows with water provides a significant amount of lubrication preventing further deterioration of the tows.

Figure 7:
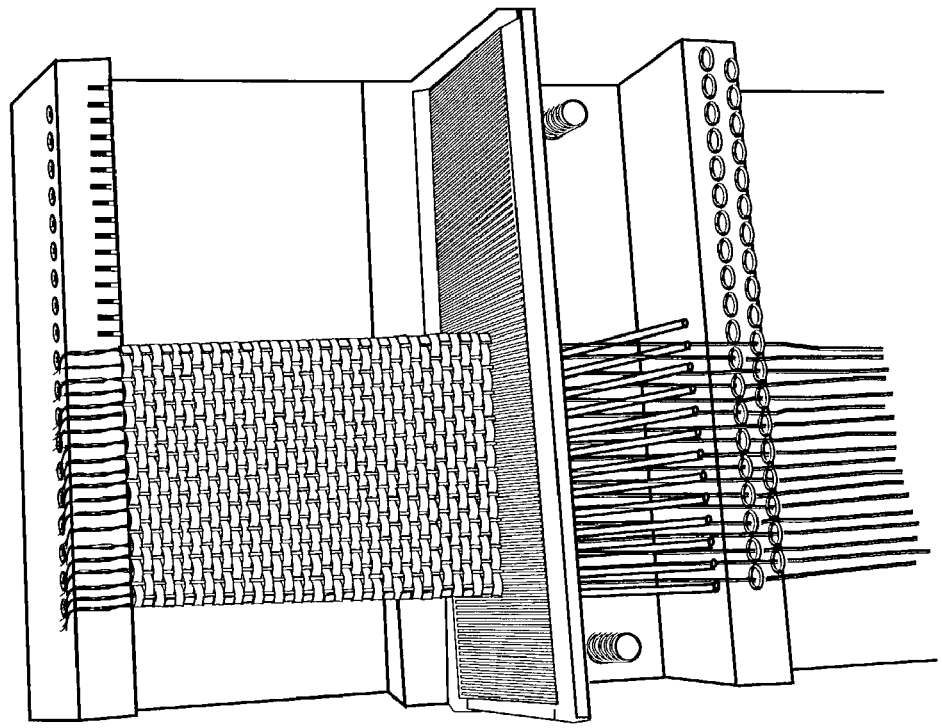
FIG. 7 shows another view of the FIG. 5 weaving apparatus together with a present invention structurally integrated capacitor fabric sample.

The fabric material formed with the laboratory-weaving machine 500 achieves a desirable level of uniformity and is comparable to material fabricated by commercial weavers. The size of the material fabricated is limited by the initial placement of the tow tie downs 522 and the reed 510. As the woven material forms, the gap available to pass the quill through is reduced since the graphite tows and the capacitor elements are brought closer together as shown in FIG. 7 with each pass of a fill tow. The completed test specimen fabric and the quill are shown in FIG. 7 and FIG. 8 of the drawings.

After removing the test element from the loom the material remains flat without cupping from relieving the tension of the warp tows. The material also shows no noticeable anomalies in the graphite. The copper wires of the capacitor elements do not show effects such as abrasion from the weaving process. A close-up view of a fabric test sample is shown in FIG. 8 of the drawings.

Electrical Evaluation of Fabric

Figure 8:
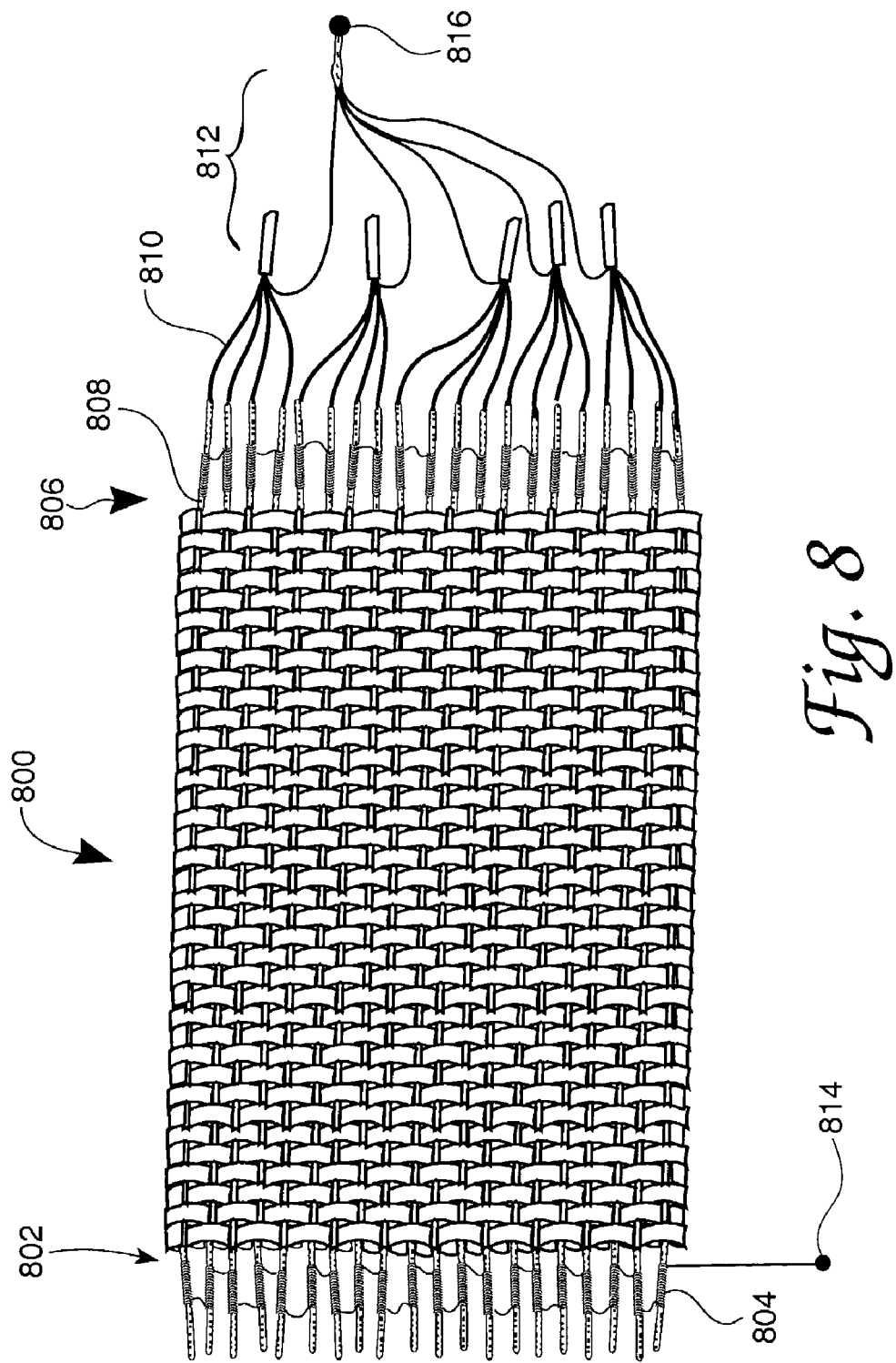
FIG. 8 shows a fabric sample of the FIG. 6 and FIG. 7 type together with capacitor element interconnections.

A test sample of fabric as described above may be wired for testing in the manner also shown in the FIG. 8 drawing. This wiring for testing may be accomplished by linking the outer conductors (conductive paint surface) of each capacitor element together along one edge 802 of the fabric sample 800 by using a wire wrapping technique with two wraps per capacitor element and a wrapping end node as are represented at 804 and 814 in FIG. 8. Using this method as opposed to soldering, the interface between the conductive paint and the Kapton™ insulation is not damaged. Additional bus wires connecting with the node 814 may be connected to several of the FIG. 8 capacitor elements if needed in order to provide a lower impedance electrical connection between capacitor elements and node 804. At the other edge 806 of the fabric each of the capacitor elements 808 is stripped down to the central conductor and leads 810 are soldered to each. These leads 810 may be ganged together as is indicated at 812 in FIG. 8 and soldered to a common wire, i.e., a common node 816. This provides a single wire connection to the central and outer conductors of each capacitor element placing the capacitor elements in parallel and allowing for the direct attachment of an LCR meter and determination of the fabric test capacitor capacitance. The wire used for wire-wrapping the outside conductors together may be a 30-gauge copper conductor.

The described sample of fabric contains a total of 19 individual wire capacitors, offering a total of 3.5112 meters of capacitor length. Twenty-five percent of the fiber content is made from cylindrical capacitor elements. This fabric test capacitor is especially useful in the present situation for its providing of an indication of the amount of capacitance that can be incorporated into a primary structural component of an aircraft according to the present invention. Estimates of system effectiveness of the achieve capacitance are made later herein. Using Equation 13 the fabricated test capacitor shown in FIG. 8, a capacitor of some three and one-half inches by six inches physical area may be calculated to provide a capacitance of 2.2688 nanofarads.

Experimental Evaluation of the Fabric Capacitance

The fabric test capacitor may be electrically tested in a manner similar to the experimental wire test capacitor described above. Data recorded during a frequency sweep is shown in Table 4 below. The average capacitance recorded across the Table 4 frequency sweep is 1.7636-nanofarads, or 77.5 percent of the theoretical capacitance of the fabric test sample. This compares well to the experimental value recorded for the test wire capacitor described above (where 78% of theoretical value was achieved).

Figure 9:
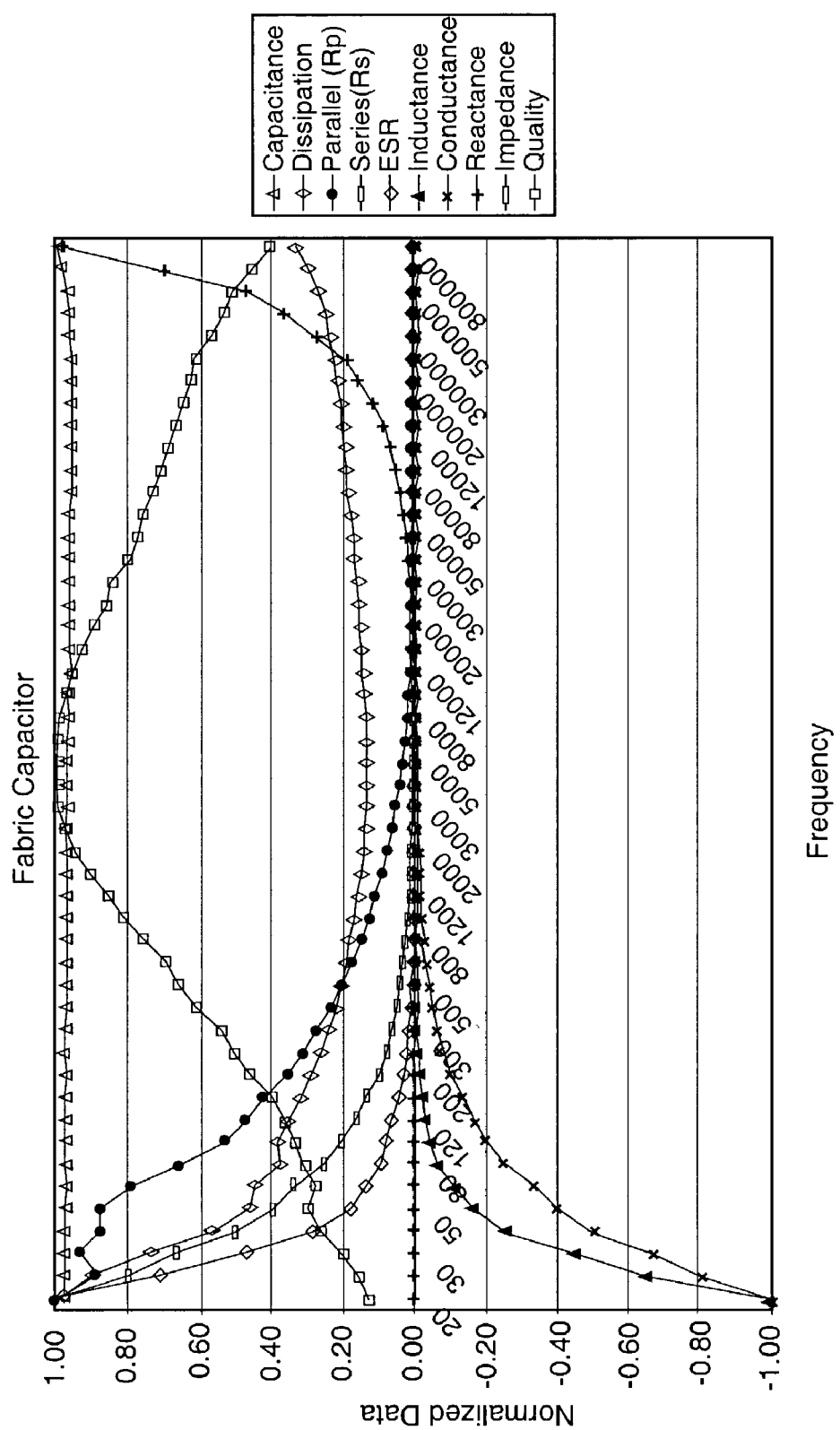
FIG. 9 shows normalized electrical values for the FIG. 8 fabric test capacitor.

The normalized electrical values for the measured fabric test capacitor properties are shown in FIG. 9 of the drawings. The dissipation factor experienced by the fabric test capacitor is on the same order of magnitude experienced in the wire test. However, in reviewing the normalized data it may be observed that the dissipation factor experiences relatively high values at low frequencies early in the sweep, and is a minimum around 5000 Hz. From there the DF gradually increases as it approaches 1 MHz. The DF for the fabric test capacitor starts out at 0.026, a value that is reasonable, however a lower value is desirable. These values correlate with the quality factor, which closely resembles the inverse of the dissipation factor. The high value of dissipation at low frequencies suggests investigation to understand what variables are driving this characteristic. The metallization is strongly suspect as well as the quality of the dielectric/insulation material. The insulation material used was not optimized for dielectric applications. However, the overall DF needs to be reduced and it is expected that this can be easily achieved. The ESR loss values in Table 4 are also of the same magnitude as those observed in the wire test capacitor, and the normalized data shows similar loss characteristics, which are primarily from the dielectric losses at the low frequencies tested. The parallel resistance has shown a drop by about 1 order of magnitude as compared to the wire test, which indicates a more effective configuration to achieve high capacitance. The series resistance has also dropped which is not desired, but it has not dropped significantly.

TABLE 4

Frequency Sweep For Fabric Capacitor Test

Data File D:\CAPDAS_DATA\LCR_DATA\2000_08_31\KAPTON_WIRE_1
Capacitor Material Polymer
Manufacturer WILLIAM BARON
Characterization Type frequency
Oscillator Type Voltage 1 000000
Bias Type None
Averaging Number 10

| FRE-QUENCY | CAPAC-ITANCE | DISSIPA-TION | PARALLEL (Rp) | SERIES (Rs) | ESR | INDUCT-ANCE | CONDUCT-ANCE | REACTANCE | IMPEDANCE | QUALITY |
|---|---|---|---|---|---|---|---|---|---|---|
| 20 | 1.78E−09 | 2.64E−02 | 1.68E+08 | 1.18E+05 | 2.37E+05 | −3.56E+04 | −4.46E+06 | 6.28E−09 | 4.47E+06 | 3.60E+01 |
| 25 | 1.78E−09 | 2.39E−02 | 1.49E+08 | 8.38E+04 | 1.70E+05 | −2.28E+04 | −3.58E+06 | 6.51E−09 | 3.58E+06 | 4.44E+01 |
| 30 | 1.78E−09 | 1.93E−02 | 1.58E+08 | 5.56E+04 | 1.12E+05 | −1.58E+04 | −2.98E−06 | 6.33E−09 | 2.98E+06 | 5.49E+01 |
| 40 | 1.78E−09 | 1.50E−02 | 1.49E+08 | 3.42E+04 | 6.80E+04 | −8.91E+03 | −2.24E+06 | 6.67E−09 | 2.24E+06 | 7.31E+01 |
| 50 | 1.78E−09 | 1.20E−02 | 1.48E+08 | 2.14E+04 | 4.31E+04 | −5.71E+03 | −1.79E+06 | 6.75E−09 | 1.79E+06 | 8.35E+01 |
| 60 | 1.77E−09 | 1.18E−02 | 1.33E+08 | 1.60E+04 | 3.27E+04 | −3.96E+03 | −1.50E+06 | 8.34E−09 | 1.50E+06 | 7.79E+01 |
| 80 | 1.77E−09 | 9.86E−03 | 1.11E+08 | 1.16E+04 | 2.29E+04 | −2.23E+03 | −1.12E+06 | 1.01E−08 | 1.12E+06 | 8.67E+01 |
| 100 | 1.77E−09 | 1.00E−02 | 8.95E+07 | 9.07E+03 | 1.81E+04 | −1.43E+03 | −8.98E+05 | 1.18E−08 | 8.98E+05 | 9.47E+01 |
| 120 | 1.77E−09 | 9.34E−03 | 7.96E+07 | 7.09E+03 | 1.41E+04 | −9.93E+02 | −7.48E+05 | 1.27E−08 | 7.48E+05 | 1.03E+02 |
| 150 | 1.77E−09 | 8.49E−03 | 7.02E+07 | 5.16E+03 | 1.03E+04 | −6.36E+02 | −5.99E+05 | 1.48E−08 | 5.99E+05 | 1.12E+02 |
| 200 | 1.77E−09 | 7.58E−03 | 5.91E+07 | 3.43E+03 | 6.85E+03 | −3.58E+02 | −4.49E+05 | 1.72E−08 | 4.49E+05 | 1.29E+02 |
| 250 | 1.77E−09 | 6.82E−03 | 5.18E+07 | 2.50E+03 | 5.00E+03 | −2.29E+02 | −3.60E+05 | 1.94E−08 | 3.60E+05 | 1.42E+02 |
| 300 | 1.77E−09 | 6.43E−03 | 4.67E+07 | 1.94E+03 | 3.87E+03 | −1.59E+02 | −3.00E+05 | 2.21E−08 | 3.00E+05 | 1.52E+02 |
| 400 | 1.77E−09 | 5.75E−03 | 3.90E+07 | 1.29E+03 | 2.58E+03 | −8.95E+01 | −2.25E+05 | 2.59E−08 | 2.25E+05 | 1.71E+02 |
| 500 | 1.77E−09 | 5.28E−03 | 3.41E+07 | 9.55E+02 | 1.91E+03 | −5.73E+01 | −1.80E+05 | 2.99E−08 | 1.80E+05 | 1.85E+02 |
| 600 | 1.77E−09 | 5.04E−03 | 2.98E+07 | 7.60E+02 | 1.52E+03 | −3.98E+01 | −1.50E+05 | 3.37E−08 | 1.50E+05 | 1.96E+02 |
| 800 | 1.77E−09 | 4.60E−03 | 2.43E+07 | 5.23E+02 | 1.04E+03 | −2.24E+01 | −1.13E+05 | 4.13E−08 | 1.13E+05 | 2.15E+02 |
| 1000 | 1.77E−09 | 4.34E−03 | 2.08E+07 | 3.91E+02 | 7.83E+02 | −1.43E+01 | −9.02E+04 | 4.80E−08 | 9.02E+04 | 2.30E+02 |
| 1200 | 1.76E−09 | 4.12E−03 | 1.82E+07 | 3.11E+02 | 6.22E+02 | −9.97E+00 | −7.52E+04 | 5.50E−08 | 7.52E+04 | 2.43E+02 |
| 1000 | 1.76E−09 | 3.92E−03 | 1.53E+07 | 2.35E+02 | 4.71E+02 | −6.38E+00 | −6.01E+04 | 6.52E−08 | 6.01E+04 | 2.55E+02 |
| 2000 | 1.76E−09 | 3.74E−03 | 1.21E+07 | 1.69E+02 | 3.38E+02 | −3.59E+00 | −4.51E+04 | 8.29E−08 | 4.51E+04 | 2.66E+02 |
| 2500 | 1.70E−09 | 3.64E−03 | 9.93E+06 | 1.32E+02 | 2.63E+02 | −2.30E+00 | −3.61E+04 | 1.01E−07 | 3.61E+04 | 2.75E+02 |
| 3000 | 1.76E−09 | 3.57E−03 | 8.43E+06 | 1.08E+02 | 2.15E+02 | −1.60E+00 | −3.01E+04 | 1.19E−07 | 3.01E+04 | 2.79E+02 |
| 4000 | 1.76E−09 | 3.55E−03 | 6.36E+06 | 8.02E+01 | 1.61E+02 | −8.99E−01 | −2.26E+04 | 1.57E−07 | 2.26E+04 | 2.81E+02 |
| 5000 | 1.76E−09 | 3.55E−03 | 5.09E+06 | 6.42E+01 | 1.28E+02 | −5.76E−01 | −1.81E+04 | 1.96E−07 | 1.81E+04 | 2.82E+02 |
| 6000 | 1.76E−09 | 3.55E−03 | 4.24E+06 | 5.36E+01 | 1.07E+02 | −4.00E−01 | −1.51E+04 | 2.35E−07 | 1.51E+04 | 2.81E+02 |
| 8000 | 1.76E−09 | 3.59E−03 | 3.15E+06 | 4.06E+01 | 8.13E+01 | −2.25E−01 | −1.13E+04 | 3.17E−07 | 1.13E+04 | 2.79E+02 |
| 10000 | 1.76E−09 | 3.67E−03 | 2.47E+06 | 3.32E+01 | 6.65E+01 | −1.44E−01 | −9.05E+03 | 4.05E−07 | 9.05E+03 | 2.73E+02 |
| 12000 | 1.76E−00 | 3.70E−03 | 2.04E+06 | 2.79E+01 | 5.59E+01 | −1.00E−01 | −7.55E+03 | 4.90E−07 | 7.55E+03 | 2.71E+02 |
| 15000 | 1.76E−09 | 3.83E−03 | 1.58E+06 | 2.31E+01 | 4.63E+01 | −6.41E−02 | −6.04E+03 | 6.34E−07 | 6.04E+03 | 2.61E+02 |
| 20000 | 1.76E−09 | 3.96E−03 | 1.14E+06 | 1.79E+01 | 3.59E+01 | −3.61E−02 | −4.53E+03 | 8.74E−07 | 4.53E+03 | 2.53E+02 |
| 25000 | 1.75E−09 | 4.14E−03 | 8.77E+05 | 1.50E+01 | 3.00E+01 | −2.31E−02 | −3.63E+03 | 1.14E−06 | 3.63E+03 | 2.42E+02 |
| 30000 | 1.75E−09 | 4.20E−03 | 7.20E+05 | 1.27E+01 | 2.54E+01 | −1.60E−02 | −3.02E+03 | 1.39E−06 | 3.02E+03 | 2.38E+02 |
| 40000 | 1.75E−09 | 4.43E−03 | 5.12E+05 | 1.01E+01 | 2.01E+01 | −9.03E−03 | −2.27E+03 | 1.95E−06 | 2.27E+03 | 2.26E+02 |
| 50000 | 1.75E−09 | 4.59E−03 | 3.96E+05 | 8.34E+00 | 1.67E+01 | −5.78E−03 | −1.82E+03 | 2.53E−06 | 1.82E+03 | 2.18E+02 |

TABLE 4-continued

Frequency Sweep For Fabric Capacitor Test

Data File D\CAPDAS_DATA\LCR_DATA\2000_08_31\KAPTON_WIRE_1
Capacitor Material Polymer
Manufacturer WILLIAM BARON
Characterization Type frequency
Oscillator Type Voltage 1 000000
Bias Type None
Averaging Number 10

| FRE-QUENCY | CAPAC-ITANCE | DISSIPA-TION | PARALLEL (Rp) | SERIES (Rs) | ESR | INDUCT-ANCE | CONDUCT-ANCE | REACTANCE | IMPEDANCE | QUALITY |
|---|---|---|---|---|---|---|---|---|---|---|
| 60000 | 1.75E−09 | 4.68E−03 | 3.24E+05 | 7.09E+00 | 1.42E+01 | −4.02E−03 | −1.51E+03 | 3.09E−06 | 1.51E+03 | 2.14E+02 |
| 80000 | 1.75E−09 | 4.88E−03 | 2.33E+05 | 5.54E+00 | 1.11E+01 | −2.26E−03 | −1.14E+03 | 4.29E−06 | 1.14E+03 | 2.05E+02 |
| 100000 | 1.75E−09 | 5.01E−03 | 1.82E+05 | 4.56E+00 | 9.12E+00 | −1.45E−03 | −9.11E+02 | 5.50E−06 | 9.11E+02 | 2.00E+02 |
| 120000 | 1.75E−09 | 5.16E−03 | 1.47E+05 | 3.92E+00 | 7.84E+00 | −1.01E−03 | −7.59E+02 | 6.80E−06 | 7.59E+02 | 1.94E+02 |
| 150000 | 1.75E−09 | 5.32E−03 | 1.14E+05 | 3.23E+00 | 6.47E+00 | −6.45E−04 | −6.07E+02 | 8.76E−06 | 6.08E+02 | 1.88E+02 |
| 200000 | 1.75E−09 | 5.49E−03 | 8.31E+05 | 2.50E+00 | 5.00E+00 | −3.63E−04 | −4.56E+02 | 1.20E−05 | 4.56E+02 | 1.82E+02 |
| 250000 | 1.75E−09 | 5.67E−03 | 6.42E+04 | 2.07E+00 | 4.14E+00 | −2.32E−04 | −3.64E+02 | 1.56E−05 | 3.64E+02 | 1.76E+02 |
| 300000 | 1.75E−09 | 5.80E−03 | 5.23E+04 | 1.76E+00 | 3.52E+00 | −1.61E−04 | −3.04E+02 | 1.91E−05 | 3.04E+02 | 1.73E+02 |
| 400000 | 1.75E−00 | 6.27E−03 | 3.63E+04 | 1.42E+00 | 2.85E+00 | −9.04E−05 | −2.27E+02 | 2.76E−05 | 2.27E+02 | 1.60E+02 |
| 500000 | 1.76E−09 | 6.63E−03 | 2.73E+04 | 1.20E+00 | 2.40E+00 | −5.76E−05 | −1.81E+02 | 3.66E−05 | 1.81E+02 | 1.51E+02 |
| 600000 | 1.77E−09 | 6.96E−03 | 2.15E+04 | 1.05E+00 | 2.10E+00 | −3.98E−05 | −1.50E+02 | 4.63E−05 | 1.50E+02 | 1.43E+02 |
| 800000 | 1.79E−09 | 7.80E−03 | 1.43E+04 | 8.68E−01 | 1.74E+00 | −2.21E−05 | −1.11E+02 | 7.01E−05 | 1.11E+02 | 1.28E+02 |
| 1000000 | 1.82E−09 | 8.77E−03 | 9.99E+03 | 7.69E−01 | 1.54E+00 | −1.39E−05 | −8.76E+01 | 1.00E−04 | 8.76E+01 | 1.14E+02 |

Figure 10:
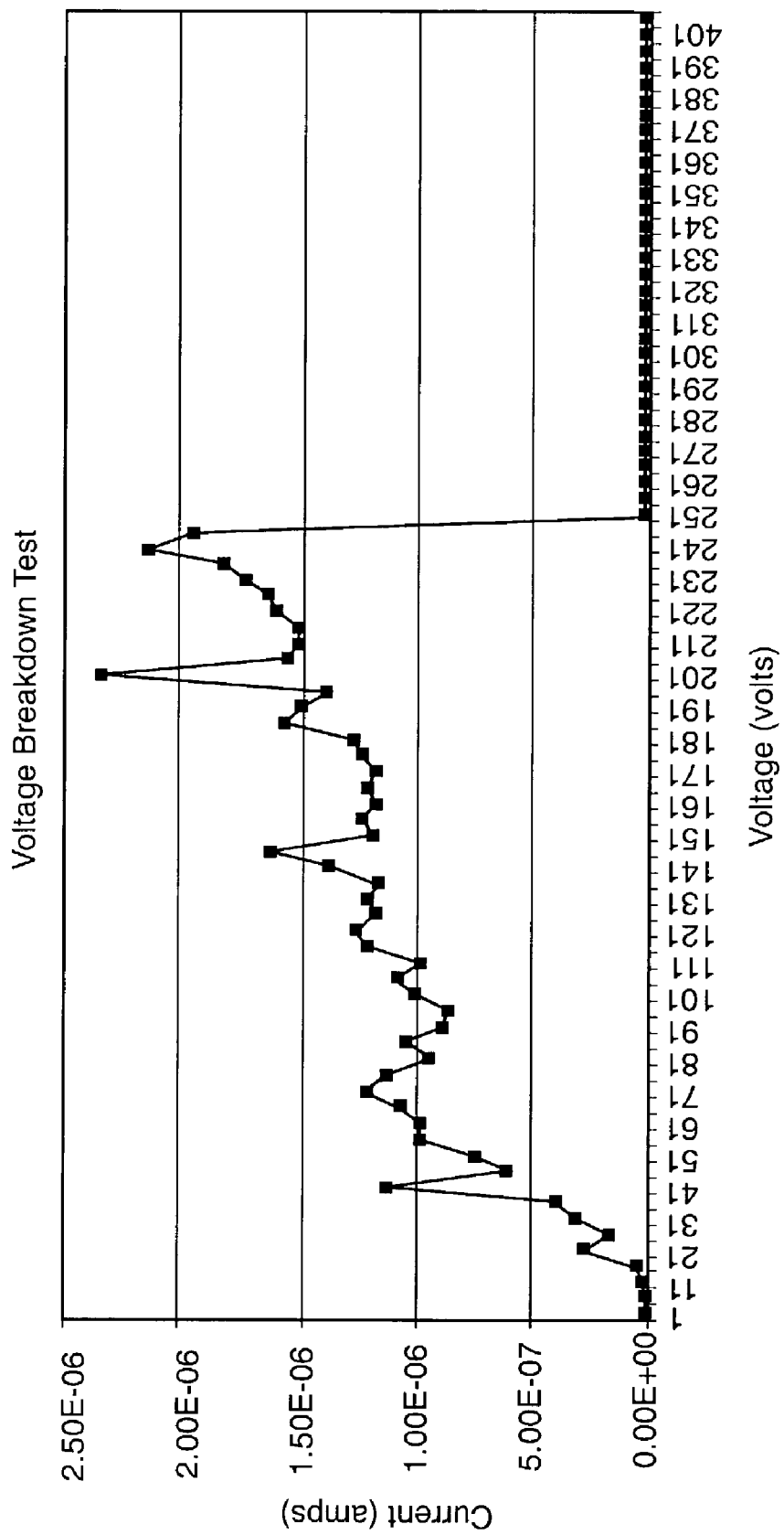
FIG. 10 shows the results of a breakdown test for the FIG. 8 fabric test capacitor.

From DC testing performed to characterize the resistive insulation of the capacitor and the current leakage at 10VDC the observed resistive insulation is 1.59E8 ohms, and the leakage current is 6.41E-8 amps. This value of resistance is much lower than that recorded for the wire test capacitor. Again, this is most likely due to inadequate metallization and the use of non-capacitor grade dielectric materials. This can be easily remedied through the selection of the dielectric material and metallization process. Voltage breakdown characteristics of the fabric test capacitor are of particular interest because it offers insight as to the level of voltage that can be applied to the capacitor, thus the overall energy storage capability available. From a pulse power standpoint this measure is significant since the energy stored in the capacitor is a square function of capacitor voltage. The results of this breakdown test are shown in FIG. 10 of the drawings; the capacitor failed at a voltage of 251 volts.

Mechanical Evaluation of Fabric (TEXCAD Computer Program Methodology)

The computer program Textile Composite Analysis for Design (TEXCAD) originates with The U.S. National Aeronautics and Space Administration (NASA) and may be used for structural modeling of the plain weave unit cell structure of the present invention. This program is a general-purpose micromechanics code that provides yarn architecture modeling of materials such as the fabric of the present invention. The program may be used to predict such fabric properties as three-dimensional thermal and mechanical properties, damage initiation and progression, and strength characteristics of the fabric. The TEXCAD software is available to U.S. citizens from the NASA Langley, Mechanics & Durability Branch and a User Guide (NASA Contractor Report 4639) is available through the Center for Aerospace Information, 800 Elkridge Landing Road Linthicum Heights, Maryland, 21090-2934, USA, telephone (301) 621-0390. Other textile-related computer software may be used in lieu of the TEXCAD software; one such software package is the "Noetram" package.

Parametric studies performed by Naik (Reference4, 5), have investigated the effects of yarn size, spacing, crimp, braid angle and fiber volume fraction for materials of the present type. Additionally, calculated strengths for tension, compression and shear have been correlated with available test data on woven and braided composite structures. The TEXCAD program is versatile and provides a number of options for fabric modeling, including the fabric types of:

1) 2D (Laminated) Composite
2) 3D Spatially Oriented Composite
3) 2D Weaves (Plain, ⅝-Harness Satin)
4) 2D Braids (Plain, ⅝-Harness Satin)
5) 2D 2×2 Triaxial Braid
6) 2D 1×1 Triaxial Braid
7) 3D Multi-Interlock 5-Layer Braid
8) Customized Textile Unit Cell Analytic Methodology The TEXCAD geometric model of the textile is based on the periodicity of the structure by defining a repeating unit cell of material within the fabric. This geometric representation is based on formation of a lenticular cross-sectional shape of the composite yarns, which is in turn based on observations by Naik from the evaluation of photomicrographs of consolidated textile material. The TEXCAD code requires the input of the fiber volume fractions of the yarns, the overall fiber volume fraction of the composite, definition of the tow filaments, geometry of the tows and the associated material properties. After the architecture is defined the code calculates the three dimensional effective stiffnesses for the composite by discretizing each yarn of the unit cell into slices of material and uses the properties definition with a volume averaging technique that assumes an iso-strain state within the unit cell structure.

Plain Weave Geometric Model

The modeling of standard plain weave structure will be the focus of this discussion since this is the general construction of the present invention-related fabric, and represents a summary of the methodology developed by Naik incorporated into TEXCAD. The yarn cross sectional area within the plain weave is assumed to be the same for the warp and fill yarns. The undulations of the yarns in a plain weave structure are shown in the cross sectional view of FIG. 11b in the drawings. The position of the undulations in the unit cell, are characterized by defining the cross over points as shown in the cross-section of this drawing.

The notation for defining the geometry of the unit cell used in the TEXCAD program employs following variables:

TABLE 5

Variable Definition of TEXCAD Unit Cell Geometry

| | |
|---|---|
| A | Cross Sectional Area |
| $L_p$ | Projected Length |
| H | Unit Cell Thickness |
| $p_d$ | Yarn Packing Density |
| a | Yarn Spacing |
| $V_f$ | Overall Fiber Volume Fraction |
| $d_f$ | Filament Diameter |
| n | Filament Count |
| $L_u$ | Undulation Length |

The unit cell volume is defined as $4*A*L_p$, and the dimensions of the cell as $L_p \times L_p \times H$ where H is the unit cell thickness. Any volume not occupied in the unit cell by the yarns is assigned to the matrix material. The overall volume fraction of the unit cell can then be defined by:

$$V_f = \frac{2p_d A}{Ha} \qquad \text{Equation 16}$$

Using the yarn filament count and the filament diameter the unknown cross-sectional area is defined by:

$$A = \frac{\pi d_f^2 n}{4 p_d} \qquad \text{Equation 17}$$

For a given overall fiber volume fraction the thickness H can be determined from Equation 16 and Equation 17. The yarn packing density can be determined experimentally through photomicrograph inspection or from assumption, since it is generally between 0.70–0.80 as suggested by Naik. The yarn thickness is assumed to be H/2, which is also equal to the vertical shift $V_s$ of a plain weave and the yarn width is assumed to be equal to the yarn spacing since no gaps in the weave can be assumed if the yarns are tightly packed. The undulations of the yarns in the unit cell are modeled using a sinusoidal function description. The sine function used by Naik to represent the undulations is $Z_c$ as defined by:

$$Z_c = \pm \frac{V_s}{2} \sin\left(\frac{\pi X_c}{L_u}\right) \qquad \text{Equation 18}$$

where, $X_c$ is measured for the corresponding cross over point along the warp or fill directions. The sign convention is used to describe the undulations at the cross over points, with a positive sign defining the cross over points on the boundaries of the unit cell. As shown in FIG. 11 the cross sectional area is characterized by a flat section of yarn and two lenticular end portions. The curved end portions are described by the sinusoidal function of the Equation 18 form, and the width of the curved portion is set equal to $L_u/2$, and the cross sectional area is set equal to:

$$A = wt - L_u V_s \left(1 - \frac{2}{\pi}\right) \qquad \text{Equation 19}$$

From Equation 19 and Equation 17 the unknown parameter L, is calculated. The length of the straight portions of the yarns are expressed as:

$$L_{st} = 2a - 2L_u \qquad \text{Equation 20}$$

Using the preceding equations of this section all of the geometric properties of the unit cell are calculated by TEXCAD.

Discretization Methodology

In order to calculate the overall composite properties yarns of the unit cell may be discretized in a number of portions. The straight segments of each yarn may be modeled with a single slice while the curved sections are evenly divided by input number of piecewise straight slices. The spatial position of the yarns may be defined with the use of two angles, the in-plane angle θ and the out-of-plane angle β. In the case of a plain weave the in-plane angle is either zero for fill yarns or 90 for warp yarns. The out-of-plane angle is calculated for each yarn slice by differentiating the sine function used to describe the yarn undulation centerline.

Three-Dimensional Effective Properties and Failure Calculation

This discussion relates to the solution strategy used by TEXCAD to solve for the properties of the unit cell. For a thorough discussion of the TEXCAD analytical procedure, the referenced literature by Naik provides appropriate detail. TEXCAD uses the spatial orientation of the yarns defined by the in-plane and out-of-plane angles within the unit cell, with a transversely isotropic assumption for the yarns in all yarn slices defined by the user to calculate the overall stiffness properties. Naik (Reference 4–6) performed a convergence sensitivity study for woven materials and found that the solution converged in all cases when the number of slices taken is greater than or equal to 12. The program uses a stress averaging technique based on an iso-strain assumption to compute the overall effective stiffness matrix. This matrix is written as a summation over all of the yarn slices across the yarn undulations. This summation is written in terms of the yarn slice stiffness matrix $|C|_m$ and the transformation matrix $[T]_m$. This relation is shown below:

$$[C]_{\text{eff}} = \sum_{m=1}^{N} (V_m [T]_m^T [C']_m [T]_m) \qquad \text{Equation 21}$$

Thermal residual stresses of the yarn slices are also included in the analysis as an option to the user, and are also based on the iso-strain assumption. The relation below gives the thermal residual stress for the $m^{th}$ yarn slice:

$$\{\sigma^T\}_m = \Delta T [C']_m \{[T]_m \{\overline{\alpha}\} - \{\alpha'\}_m\} \qquad \text{Equation 22}$$

Where ΔT is the change in temperature, {α'} are the coefficients of thermal expansion of the $m^{th}$ yarn slice, and {$\overline{\alpha}$} are the overall CTE for the unit cell. Where {$\overline{\alpha}$} is given by:

$$\{\bar{\sigma}\} = [C_{\mathit{eff}}]^{-1} \left\{ \sum_{m=1}^{N} (V_m[T]_m^T[C']_m\{\alpha'\}_m) \right\} \quad \text{Equation 23}$$

As a result of matrix material shear non-linearity Naik adopted a representation to model the non-linear shear response of both the impregnated yarns and the resin. This relationship is used to calculate the shear moduli $G_{12}$ and $G_{13}$ for each yarn slice in the unit cell during each incremental load. For the interstitial matrix material the octahedral shear strain and stress may be used. The overall stiffness matrix may be computed at each incremental applied stress and use the Newton-Raphson Method. The cumulative stresses in each slice are used with the appropriate failure criteria to determine the failure at each increment of stress. For the undulating portions of the yarns a beam on an elastic foundation may be used thus accounting for the nonlinear effects of yarn straightening and wrinkling. For yarn slices failing in the undulation in a transverse or longitudinal shear mode, failure may be accounted for using a cracked yarn-bending model. The TEXCAD model uses a stiffness reduction approach to account for progressive failure of the composite unit cell.

Structural Evaluation of the Fabric

This analysis is directed at characterizing the stiffness sensitivity of the cylindrical capacitor copper wire in the unit cell. Three different configurations have been analyzed in the data following including an all-composite plain weave unit cell, an idealized unit cell incorporating the copper capacitor in place of a tow and an idealized unit cell with the capacitor as two of the unit cell tows. The three configurations are compared to ascertain the changes in stiffness that the capacitor introduces.

Plain Weave Graphite

This analysis uses two material definitions, the resin and the properties of AS4/3501-6 tow. The properties have been input in SI units with the resin designated as material ID #2 and the tow properties as material ID#1 in the input data list below. Additional inputs required for this analysis include the yarn spacing, size, and packing density along with the fiber volume fraction. The output of this analysis includes the weave and undulation parameters, and the effective stiffness and thermal properties of the unit cell. The following is a listing of the TEXCAD output data.

AS4 Plain Weave
  MATERIAL ID NO. 1
  E11, E22, NU12, G12, NU23, ALFA11, ALFA22, SE
    .1448E+12 .1173E+11 .2300E+00 .5516E+10 .3000E+00−.3240E−06 .1400E−04 .2780E+01
  STEN11, SCOMP11, STEN22, SCOMP22, SHEAR12, SHEAR23 .1400E−01 .1000E−01 .2600E+08 .2060E+09 .8750E+08 .1024E+09
  MATERIAL ID NO. 2
  E11, E22, NU12, G12, NU23, ALFA11, ALFA22, SE
    .3448E+10 .3448E+10 .3500E+00 .1276E+10 .3500E+00 .4000E−04 .4000E−04 .2340E+01
  STEN11, SCOMP11, STEN22, SCOMP22, SHEAR12, SHEAR23 .8485E+08 .8485E+08 .8485E+08 .8485E+08 .9830E+08 .9830E+08

PLAIN WEAVE/BRAID PARAMETERS-INPUT

YARN SPACING=2.549
YARN SIZE (k)=12
YARN PACKING DENSITY=.750
COMPOSITE Vf (%)=60.000

WEAVE/BRAID PARAMETERS-CALCULATED

FRACTIONAL VOLUME OF Yarns IN UNIT CELL=.80000
FRACTIONAL VOLUME OF Interstitial Matrix IN UNIT CELL=.20000
FRACTIONAL VOLUME OF Fibers IN UNIT CELL=.60000
LAYER THICKNESS=.604
Yarn Undulation Parameters
Crimp Angle=18.680
Sinusoidal Undulation Length=1.403
Vertical Shift at Cross Over Point=.302
Yarn Characteristics
Thickness .302
C/S Area .616
Proj. Length 5.098

| OVERALL STIFFNESS MATRIX FOR UNIT CELL COMPONENTS ARE IN FOLLOWING ORDER - XX,YY,ZZ,XY,YZ,ZX | | | | | |
|---|---|---|---|---|---|
| .62020E+11 | .37191E+10 | .51252E+10 | .46143E−07 | −.70816E−09 | −.27884E−06 |
| .37191E+10 | .62020E+11 | .51252E+10 | .30471E−05 | −.27884E−06 | −.70816E−09 |
| .51252E+10 | .51252E+10 | .11823E+11 | .82912E−07 | .32487E−08 | .32487E−08 |
| .46143E−07 | .30471E−05 | .82912E−07 | .46448E+10 | .33674E−09 | −.33674E−09 |
| −.91401E−09 | −.51726E−06 | .10699E−07 | −.45683E−08 | .56589E+10 | .10844E−06 |
| −.51726E−06 | −.91401E−09 | .10699E−07 | −.45683E−08 | .10844E−06 | .56587E+10 |

| OVERALL COMPLIANCE MATRIX FOR UNIT CELL COMPONENTS ARE IN FOLLOWING ORDER - XX,YY,ZZ,XY,YZ,ZX | | | | | |
|---|---|---|---|---|---|
| .16733E−10 | −.41898E−12 | −.70724E−11 | .23487E−27 | −.14491E−28 | .82858E−27 |
| −.41898E−12 | .16733E−10 | −.70724E−11 | −.10847E−25 | .82855E−27 | −.14492E−28 |
| −.70724E−11 | −.70724E−11 | .90716E−10 | .30906E−26 | −.40146E−27 | −.40147E−27 |
| .23487E−27 | −.10847E−25 | .30906E−26 | .21529E−09 | .12811E−28 | .12812E−28 |

-continued

OVERALL COMPLIANCE MATRIX FOR UNIT CELL
COMPONENTS ARE IN FOLLOWING ORDER - XX,YY,ZZ,XY,YZ,ZX

| | | | | | |
|---|---|---|---|---|---|
| −.22224E−28 | .15428E−26 | −.81912E−27 | .17380E−27 | .17671E−09 | −.33866E−26 |
| .15429E−26 | −.22224E−28 | .81915E−27 | .17381E−27 | −.33866E−26 | .17672E−09 |

UNIT CELL OVERALL PROPERTIES

| | | |
|---|---|---|
| EXX = .59761E+11 | EYY = .59761E+11 | EZZ = .11023E+11 |
| NuXY = .02504 | NuYX = .02504 | |
| NuXZ = .42265 | NuYZ = .42265 | |
| GXY = .46448E+10 | GYZ = .56589E+10 | GXZ = .56587E+10 |

UNIT CELL OVERALL THERMAL COEFFICIENTS

| ALPHAXX | ALPHAYY | ALPHAZZ | ALPHAXY | ALPHAYZ | ALPHAZX |
|---|---|---|---|---|---|
| .15191E−05 | .15191E−05 | .22106E−04 | −.22998E−20 | .72539E−22 | .72541E−22 |

Customized Weave with One Capacitive Element per Unit Cell

In order to model a plain weave unit cell with the capacitor elements the customized unit cell weave option within the TEXCAD program may be used with a third material defined for the capacitor element. This third material is used as a unit cell data file to define the undulation characteristics. This analysis is intended to provide a "rough" estimate of the approximate stiffness degradation as a result of including the capacitor elements. In this weave analysis, the code models all fiber elements with the same undulation pattern. This introduces some error in modeling the fabric capacitor because as the fabric is woven the increased stiffness of the copper elements prevents the material from taking on the same pattern as the non-impregnated carbon tows. Therefore, it can be assumed that this analysis represents a conservative estimate since the stiffness properties of a straight segment are higher than that produced from an undulating yarn. The density of the unit cell is slightly under-predicted on account of the fact that the additional copper material from the undulation is not accounted for in the subsequent calculations.

The TEXCAD customized weave analysis option assumes that all of the tows are of the same diameter, therefore it is necessary to modify the stiffness of the copper tow elements. To represent the capacitor elements it is necessary to transform the section properties of the Kapton™/Copper wire to an all copper element, and then adjust the stiffness of this element relative to the area of the carbon tow. Using this procedure a modulus of elasticity of $E_{trans}$=23.446 Gpa is calculated. The shear modulus may then be calculated assuming an isotropic material with an assumed poisson ratio of 0.3, which yields a value of $G_{trans}$=7.105 Gpa. These materials are entered for tow #1, and material ID #2 below in the TEXCAD input file.

MATERIAL ID NO. 1
E11, E22, NU12, G12, NU23, ALFA11, ALFA22, SE
 .1448E+12 .1173E+11 .2300E+00 .5516E+10
 .3000E+00−.3240E−06 .1400E−04 .2780E+01
STEN11, SCOMP11, STEN22, SCOMP22, SHEAR12, SHEAR23 .1400E−01 .1000E−01 .2600E+08 .2060E+09 .8750E+08 .1024E+09
MATERIAL ID NO. 2
E11, E22, NU12, G12, NU23, ALFA11, ALFA22, SE
 .2345E+11 .2345E+11 .3000E+00 .7105E+10
 .3000E+00 .1000E+01 .1000E+01.2780E+01
STEN11, SCOMP11, STEN22, SCOMP22, SHEAR12, SHEAR23 .1000E+01 .1000E+01 .1000E+01 .1000E+01 .1000E+.1000E+01
MATERIAL ID NO. 3
E11, E22, NU12, G12, NU23, ALFA11, ALFA22, SE
 .3448E+10 .3448E+10 .3500E+00 .1276E+10
 .3500E+00 .4000E−04 .4000E−04 .2340E+01
STEN11, SCOMP11, STEN22, SCOMP22, SHEAR12, SHEAR23 .8485E+08 .8485E+08 .8485E+08 .8485E+08 .9830E+08 .9830E+08
UNIT CELL DIMENSIONS
LENGTH1, LENGTH2, INCLUDED ANGLE, THICKNESS 5.098000 5.098000 90.000000 .604000
TOTAL NO OF YARNS IN UNIT CELL 4
YARN ID, MAT ID, THETA, YARN AREA, PROJECTED LENGTH, NO. OF C/O POINTS 1 2 .000000 .615752 5.098000 3
C/O PT. ID, UP/DOWN, 1ST/2ND/BOTH HALF, UND. LGTH., VERT. SHIFT 1 1 2 1.402938 .301958
C/O PT. ID, UP/DOWN, 1ST/2ND/BOTH HALF, UND. LGTH., VERT. SHIFT 2 2 3 1.402938 .301958
C/O PT. ID, UP/DOWN, 1ST/2ND/BOTH HALF, UND. LGTH., VERT. SHIFT 3 1 1 1.402938 .301958
YARN ID, MAT ID, THETA, YARN AREA, PROJECTED LENGTH, NO. OF C/O POINTS 2 1 90.000000 .615752 5.098000 3
C/O PT. ID, UP/DOWN, 1ST/2ND/BOTH HALF, UND. LGTH., VERT. SHIFT 1 1 2 1.402938 .301958
C/O PT. ID, UP/DOWN, 1ST/2ND/BOTH HALF, UND. LGTH., VERT. SHIFT 2 2 3 1.402938 .301958
C/O PT. ID, UP/DOWN, 1ST/2ND/BOTH HALF, UND. LGTH., VERT. SHIFT 3 1 1 1.402938 .301958
YARN ID, MAT ID, THETA, YARN AREA, PROJECTED LENGTH, NO. OF C/O POINTS 3 1 .000000 .615752 5.098000 3

C/O PT. ID, UP/DOWN, 1ST/2ND/BOTH HALF, UND. LGTH., VERT. SHIFT 1 2 2 1.402938 .301958
C/O PT. ID, UP/DOWN, 1ST/2ND/BOTH HALF, UND. LGTH., VERT. SHIFT 2 1 3 1.402938 .301958
C/O PT. ID, UP/DOWN, 1ST/2ND/BOTH HALF, UND. LGTH., VERT. SHIFT 3 2 1 1.1402938 .301958
YARN ID, MAT ID, THETA, YARN AREA, PROJECTED LENGTH, NO. OF C/O POINTS 4 1 90.000000 .615752 5.098000 3
C/O PT. ID, UP/DOWN, 1ST/2ND/BOTH HALF, UND. LGTH., VERT. SHIFT 1 2 2 1.402938 .301958
C/O PT. ID, UP/DOWN, 1ST/2ND/BOTH HALF, UND. LGTH., VERT. SHIFT 2 1 3 1.402938 .301958
C/O PT. ID, UP/DOWN, 1ST/2ND/BOTH HALF, UND. LGTH., VERT. SHIFT 3 2 1 1.402938 .301958
END OF INPUT DATA
    FRACTIONAL VOLUME OF YARNS IN UNIT CELL=.79989
    FRACTIONAL VOLUME OF INTERSTITIAL MATRIX IN UNIT CELL=.20011
    FRACTIONAL VOLUME OF FIBERS IN UNIT CELL=.59992

Customized Weave with Two Capacitive Element per Unit Cell

This analysis also used the customized weave option, but designated an additional tow in the unit cell definition as a transformed capacitor element.

MATERIAL ID NO. 1
E11, E22, NU12, G12, NU23, ALFA11, ALFA22, SE .1448E+12 .1173E+11 .2300E+00 .5516E+10 .3000E+00 -.3240E-06 .1400E-04 .2780E+01
STEN11, SCOMP11, STEN22, SCOMP22, SHEAR12, SHEAR23 .1400E-01 .1000E-01 .2600E+08 .2060E+09 .8750E+08 .1024E+09
MATERIAL ID NO. 2
E11, E22, NU12, G12, NU23, ALFA11, ALFA22, SE .2345E+11 .2345E+11 .3000E+00 .7105E+10 .3000E+00 .1000E+01 .1000E+01 .2780E+01
STEN11, SCOMP11, STEN22, SCOMP22, SHEAR12, SHEAR23 .1000E+01 .1000E+01 .1000E+01 .1000E+01 .1000E+01 .1000E+01
MATERIAL ID NO. 3
E11, E22, NU12, G12, NU23, ALFA11, ALFA22, SE .3448E+10 .3448E+10 .3500E+00 .1276E+10 .3500E+00 .4000E-04 .4000E-04 .2340E+01

| OVERALL STIFFNESS MATRIX FOR UNIT CELL COMPONENTS ARE IN FOLLOWING ORDER - XX, YY, ZZ, XY, YZ, ZX ||||||
|---|---|---|---|---|---|
| .40429E+11 | .56432E+10 | .63999E+10 | .46137E-07 | -.10843E-08 | .21808E-06 |
| .56432E+10 | .65725E+11 | .70361E+10 | .30467E-05 | .45649E-06 | -.26559E-08 |
| .63999E+10 | .70361E+10 | .15414E+11 | .82900E-07 | .91952E-07 | .32347E-07 |
| .46137E-07 | .30467E-05 | .82900E-07 | .49789E+10 | .94074E-08 | .28881E-08 |
| .20007E-08 | .37227E-06 | .80126E-07 | -.65871E-08 | .65426E+10 | .10843E-06 |
| .13385E-06 | -.10843E-08 | .35423E-07 | -.56558E-08 | .10843E-06 | .53262E+10 |

| OVERALL COMPLIANCE MATRIX FOR UNIT CELL COMPONENTS ARE IN FOLLOWING ORDER - XX, YY, ZZ, XY, YZ, ZX ||||||
|---|---|---|---|---|---|
| .26558E-10 | -.11563E-11 | -.10499E-10 | .63629E-27 | .23264E-27 | -.10242E-26 |
| -.11563E-11 | .16047E-10 | -.68450E-11 | -.96946E-26 | -.10236E-26 | .96917E-28 |
| -.10499E-10 | -.68450E-11 | .72360E-10 | .30810E-26 | -.54113E-27 | -.12997E-28 |
| .63629E-27 | -.96946E-26 | .30810E-26 | .20085E-09 | -.28879E-27 | -.10891E-27 |
| .18626E-27 | -.82887E-27 | -.49351E-27 | .20221E-27 | .15285E-09 | -.31116E-26 |
| -.59782E-27 | .77849E-28 | -.21880E-27 | .21328E-27 | -.31116E-26 | .18775E-09 |

| UNIT CELL OVERALL PROPERTIES |||
|---|---|---|
| EXX = .37653E+11 | EYY = .62317E+11 | EZZ = .13820E+11 |
| NuXY = .04354 | NuYX = .07206 | |
| NuXZ = .39533 | NuYZ = .42656 | |
| GXY = .49789E+10 | GYZ = .65426E+10 | GXZ = .53262E+10 |

| UNIT CELL OVERALL THERMAL COEFFICIENTS ||||||
|---|---|---|---|---|---|
| ALPHAXX | ALPHAYY | ALPHAZZ | ALPHAXY | ALPHAYZ | ALPHAZX |
| .17468E+00 | .94306E-01 | .64488E+00 | -.70064E-16 | -.13317E-16 | -.27687E-17 |

STEN11, SCOMP11, STEN22, SCOMP22, SHEAR12, SHEAR23 .8485E+08 .8485E+08 .8485E+08 .8485E+08 .9830E+08 .9830E+08

UNIT CELL DIMENSIONS

LENGTH1, LENGTH2, INCLUDED ANGLE, THICKNESS 5.98000 5.098000 90.000000 .604000

TOTAL NO OF YARNS IN UNIT CELL 4

YARN ID, MAT ID, THETA, YARN AREA, PROJECTED LENGTH, NO. OF C/O POINTS 1 2 .000000 .615752 5.098000 3

C/O PT. ID, UP/DOWN, 1ST/2ND/BOTH HALF, UND. LGTH., VERT. SHIFT 1 1 2 1.402938 .301958

C/O PT. ID, UP/DOWN, 1ST/2ND/BOTH HALF, UND. LGTH., VERT. SHIFT 2 2 3 1.402938 .301958

C/O PT. ID, UP/DOWN, 1ST/2ND/BOTH HALF, UND. LGTH., VERT. SHIFT 3 1 1 1.402938 .301958

YARN ID, MAT ID, THETA, YARN AREA, PROJECTED LENGTH, NO. OF C/O POINTS 2 2 90.000000 .615752 5.098000 3

C/O PT. ID, UP/DOWN, 1ST/2ND/BOTH HALF, UND. LGTH., VERT. SHIFT 1 1 2 1.402938 .301958

C/O PT. ID, UP/DOWN, 1ST/2ND/BOTH HALF, UND. LGTH., VERT. SHIFT 2 2 3 1.402938 .301958

C/O PT. ID, UP/DOWN, 1ST/2ND/BOTH HALF, UND. LGTH., VERT. SHIFT 3 1 1 1.402938 .301958

YARN ID, MAT ID, THETA, YARN AREA, PROJECTED LENGTH, NO. OF C/O POINTS 3 1 .000000 .615752 5.098000 3

C/O PT. ID, UP/DOWN, 1ST/2ND/BOTH HALF, UND. LGTH., VERT. SHIFT 1 2 2 1.402938 .301958

C/O PT. ID, UP/DOWN, 1ST/2ND/BOTH HALF, UND. LGTH., VERT. SHIFT 2 1 3 1.402938 .301958

C/O PT. ID, UP/DOWN, 1ST/2ND/BOTH HALF, UND. LGTH., VERT. SHIFT 3 2 1 1.402938 .301958

YARN ID, MAT ID, THETA, YARN AREA, PROJECTED LENGTH, NO. OF C/O POINTS 4 1 90.000000 .615752 5.098000 3

C/O PT. ID, UP/DOWN, 1ST/2ND/BOTH HALF, UND. LGTH., VERT. SHIFT 1 2 2 1.402938 .301958

C/O PT. ID, UP/DOWN, 1ST/2ND/BOTH HALF, UND. LGTH., VERT. SHIFT 2 1 3 1.402938 .301958

C/O PT. ID, UP/DOWN, 1ST/2ND/BOTH HALF, UND. LGTH., VERT. SHIFT 3 2 1 1.402938 .301958

END OF INPUT DATA

FRACTIONAL VOLUME OF YARNS IN UNIT CELL=.79989

FRACTIONAL VOLUME OF INTERSTITIAL MATRIX IN UNIT CELL=.20011

FRACTIONAL VOLUME OF FIBERS IN UNIT CELL=.59992

| OVERALL STIFFNESS MATRIX FOR UNIT CELL COMPONENTS ARE IN FOLLOWING ORDER - XX, YY, ZZ, XY, YZ, ZX | | | | | |
|---|---|---|---|---|---|
| .44142E+11 | .75675E+10 | .83111E+10 | −.22420E−07 | −.26559E−08 | .21808E−06 |
| .75675E+10 | .44142E+11 | .83111E+10 | .15663E−05 | .21808E−06 | −.26559E−08 |
| .83111E+10 | .83111E+10 | .19006E+11 | .43943E−07 | .32347E−07 | .32347E−07 |
| −.22420E−07 | .15663E−05 | .43943E−07 | .53135E+10 | .94074E−08 | .94074E−08 |
| −.10843E−08 | .13385E−06 | .35423E−07 | −.65871E−08 | .62107E+10 | .33963E−07 |
| .13385E−06 | −.10843E−08 | .35423E−07 | −.65871E−08 | .33963E−07 | .62105E+10 |

| OVERALL COMPLIANCE MATRIX FOR UNIT CELL COMPONENTS ARE IN FOLLOWING ORDER - XX, YY, ZZ, XY, YZ, ZX | | | | | |
|---|---|---|---|---|---|
| .24922E−10 | −.24198E−11 | −.98398E−11 | .89984E−27 | .14687E−27 | −.82488E−27 |
| −.24198E−11 | .24922E−10 | −.98398E−11 | −.72753E−26 | −.82485E−27 | .14688E−27 |
| −.98398E−11 | −.98398E−11 | .61220E−10 | .23528E−26 | .22442E−28 | .22442E−28 |
| .89984E−27 | −.72753E−26 | .23528E−26 | .18820E−09 | −.28507E−27 | −.28508E−27 |
| .11262E−27 | −.48139E−27 | −.13883E−27 | .19961E−27 | .16101E−09 | −.88053E−27 |
| −.48141E−27 | .11263E−27 | −.13884E−27 | .19961E−27 | −.88053E−27 | .16102E−09 |

| UNIT CELL OVERALL PROPERTIES | | |
|---|---|---|
| EXX = .40126E+11 | EYY = .40126E+11 | EZZ = .16334E+11 |
| NuXY = .09710 | NuYX = .09710 | |
| NuXZ = .39483 | NuYZ = .39483 | |
| GXY = .53135E+10 | GYZ = .62107E+10 | GXZ = .62105E+10 |

| UNIT CELL OVERALL THERMAL COEFFICIENTS | | | | | |
|---|---|---|---|---|---|
| ALPHAXX | ALPHAYY | ALPHAZZ | ALPHAXY | ALPHAYZ | ALPHAZX |
| .29683E+00 | .29683E+00 | .97384E+00 | −.94303E−16 | −.68478E−17 | −.68480E−17 |

Effective Stiffness & Weight Summary

Observing the effective stiffness for the graphite weave and the capacitor fabrics, a comparison of the stiffness degradation can be made. The values for the longitudinal and transverse effective properties are shown in summary 7.

TABLE 6

Effective Stiffness Summary

| Effective Stiffness(Pa) | Exx | Eyy | Gxy |
|---|---|---|---|
| Plain Weave | 59.761E09 | 59.761E09 | 4.645E09 |
| 25% $V_f$ Fabric Capacitor | 37.653E09 | 62.317E09 | 4.979E09 |
| 50% $V_f$ Fabric Capacitor | 40.126E09 | 40.126E09 | 5.314E09 |

This comparison shows that in the direction of the capacitor elements the fabric had a stiffness reduction of approximately 34%, and a slight increase in the transverse direction for the 25% volume fraction fabric capacitor. In the case of the 50% volume fraction capacitor, a reduction of approximately 33% was observed in the transverse and longitudinal directions.

In order to establish a rough correlation between the weight of the capacitor fabric structure and a representative aluminum structure, a volume factor can be calculated based on the stiffness mismatch. This volume factor can then be translated into an effective weight using the density. The stiffness of aluminum is approximately 70 Gpa, therefore if we limit the estimate to similar strains-to-failure an equivalent textile capacitor structure can be developed. Application of this procedure in the case of 25% volume capacitor results in significant error. To increase longitudinal properties, material must be added to achieve the same strains as would occur in the aluminum, but this results in over-sizing the transverse direction strength. In a detailed design environment the lower stiffness may be compensated for with the use of stiffeners, which are more weight efficient. In the case of the 50% volume fraction analysis the analysis is somewhat more representative because this material has effective stiffness properties characteristic of a transversely isotropic material. Therefore, if we assume the same strain to failure between aluminum and the 50% capacitor fabric (ratio of aluminum to capacitor fabric stiffness) an additional 75% of material is needed to develop the same load carrying capability at a given strain level.

Weapon System

High Power Microwave

Figure 12:
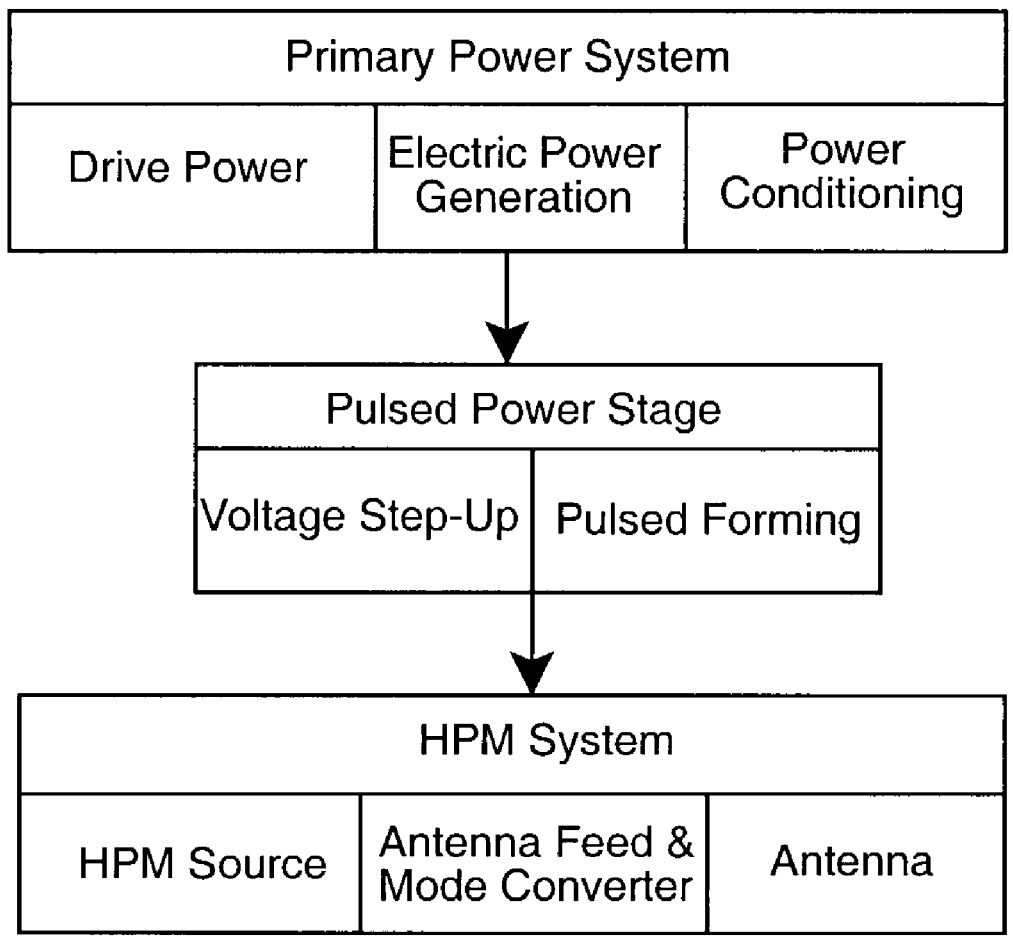
FIG. 12 shows components of a weapon system with which the present invention can be used.

The feasibility of using a high-power microwave emitter as a self-defense system against enemy weaponry is currently being considered by the U.S. Air Force. If high-power microwave energy does prove to adversely affect significant weapon electronics systems, placing a compact high-powered microwave emitter system onboard an aircraft in the manner suggested in FIG. 1 appears possible. Basic power for such a system may be derived from the vehicle engines. Such a high-powered microwave system consists of three distinct elements: 1) A Primary Power System, 2) A Pulsed Power Stage, and 3) the HPM System. These elements are shown in FIG. 12 of the drawings. The pulse power system includes a primary capacitor bank (which is not shown) to store generated energy to be used by the system. While each element of this pulse power system represents contributions to the overall weapon system weight, the primary weight component in such a system is the capacitor bank. The present invention concept of the airframe capacitive structure with addition of switching circuitry into the load will essentially replace much of the pulsed power stage shown in FIG. 12.

The FIG. 12 primary power system includes a mechanical source of energy, the mechanical to electrical transformation of this energy and the conditioning of the electrical energy for the pulsed power stage. The mechanical source can be either the main engine, or an Auxiliary Power Unit (APU). Alternative sources of primary energy may be from thermal or rechargeable batteries but this approach depends on the availability of lightweight, long life, high power battery technology becoming fully developed and usable in an operational environment. To provide power conditioning, the main engine approach may employ a High Voltage Direct Current (HVDC) system; the APU approach probably involves use of a rectifier or transformer/rectifier system.

Pulsed Power Stage

As discussed earlier herein the purpose of a pulsed power system is usually to store energy supplied at a slow rate and deliver it at a much faster rate to some load. In addition such a system may involve pulse shaping, pulse repetition rate control, system weight and size considerations, apparatus lifetime and reliability considerations etc. For pulsed electronic applications, once energy is stored it may be extracted completely or in small portions. In the mechanical case, the storage device may be coupled to a switch and depending on the switch speed and other characteristics can deliver pulsed power to some load (pulse conditioning aside). Some arrangements integrate the switching into the storage device and feed its pulsed output directly to the load. In the electrical switch case, an AC or DC power-supply stores energy through a charging unit. Once charging is complete, the switch is closed and a pulse is delivered to the load.

High frequency inverters (DC to AC) may be used as a power supply to charge the energy storage device for a few milliseconds. Once charging is complete a switch is closed delivering pulsed power to the load. In the high-energy case, for weapons applications, systems of high average powers, for times of seconds to minutes, are integrated with pulsed energy conditioning to create fast repetitive pulses of energy of duration from milliseconds down through submicroseconds. The voltages can range from kilovolts to nearly megavolts levels. As mentioned previously, the function of the pulsed power subsystem or integrated power system is to amplify the voltage from the power conditioning subsystem to that which is required by the load and to provide the necessary pulse shaping. The voltage step-up of the Pulsed Power Stage can be provided using a Marx Bank pulse forming network (PFN) or a transformer-based system. The Marx Bank allows charging of the capacitors in parallel and discharging in series through use of a spark gap device. This system provides "intermediate" voltages in the megavolt range and pulse lengths between hundreds of nanoseconds and several microseconds.

Figure 13:
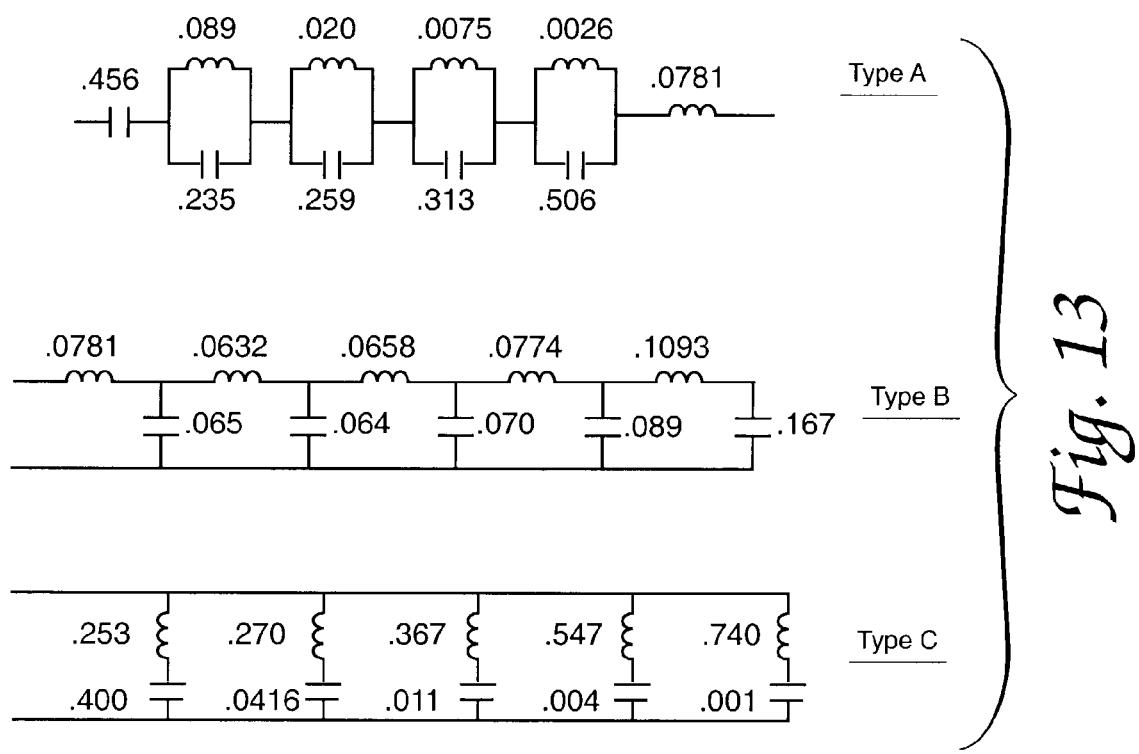
FIG. 13 shows an electrical network in which capacitor elements according to the present invention may be used.
Figure 14:
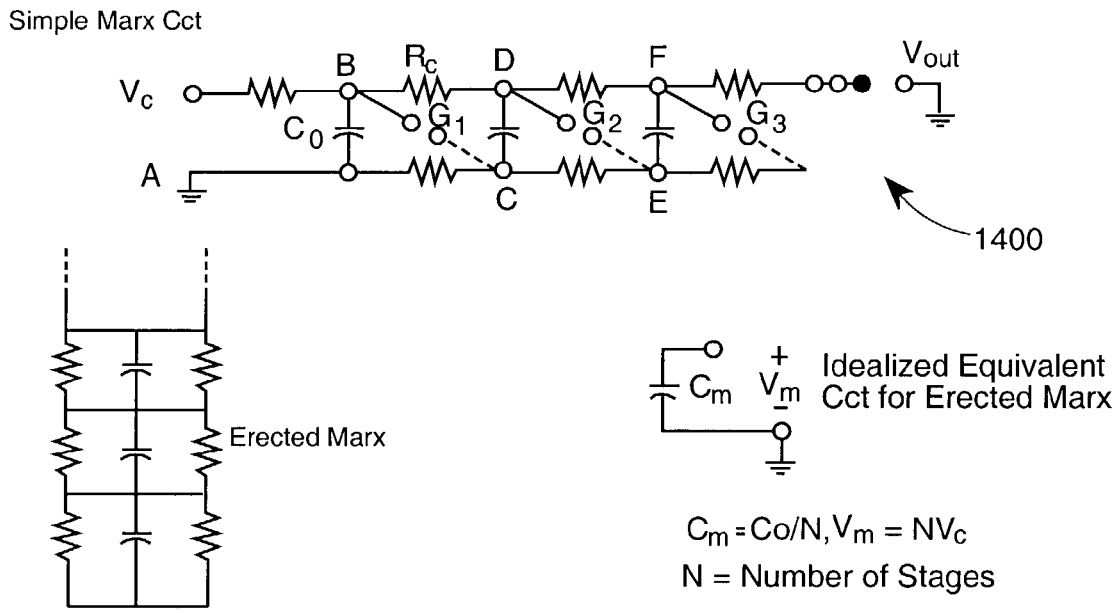
FIG. 14 shows another electrical network in which capacitor elements according to the present invention may be used.
Figure 15:
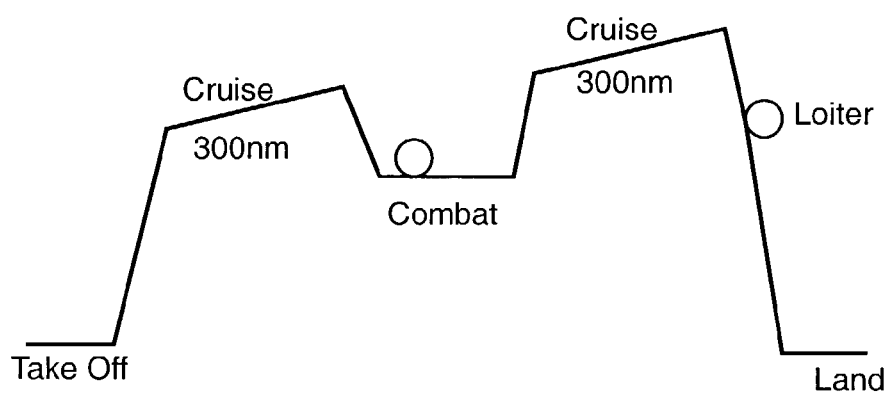
FIG. 15 shows a combat aircraft mission profile.
Figure 16:
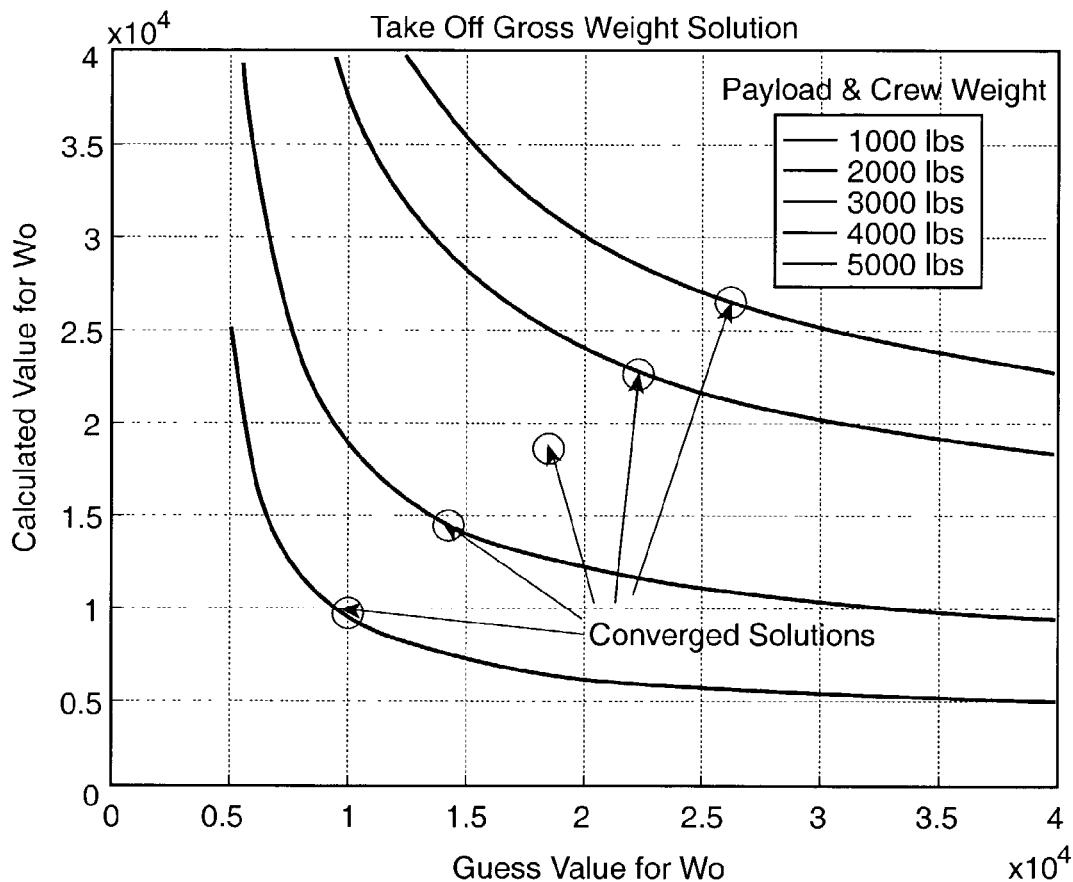
FIG. 16 shows several aircraft take off gross weight relationships.

Marx generators are probably the most common way of generating high voltage impulses for testing when the voltage level is higher than the available charging supply voltages, as is often the case in a military application. Often, a Marx bank feeds into a pulse forming network circuit of one of the three types shown in the FIG. 13 drawing in order to communicate the shaped wave to the load. For additional information regarding pulse forming network circuits see Reference 8). Pulse repetition rates are constrained by the deionizing time limits of the spark gaps G1, G2 and G3 in the FIG. 14 Marx bank circuit 1400 and will usually thus be no greater than a few tens of Hertz. The repetition rate dependence also enters through the power conditioning of the system.

As an example of frequently encountered weight considerations and need for the present invention, based upon a 3KJ pulser (inclusive of power converter, primary circuit, transformer, pulse forming network, and output switch) with a net weight of 1300 pounds, the capacitor components in the pulse forming network often account for approximately 620 pounds of this weight. If this energy storage capacity can be achieved in combination with an aircraft airframe as in the present invention, significant weight savings can be realized. The use of a transformer-based system will produce the highest repetition rates between hundreds of hertz to a kilohertz with pulse lengths greater than microseconds. The drawback of this arrangement is that the available voltages are generally limited to about the 500 kV range with output currents of about a kilo-amp. Some form of current limiting is necessary because the capacitor looks like a dead short when fully discharged. The current limiting is often in the form of series impedance. The impedance can be either inductive or resistive. A resistive current limiter is simple, but the energy dissipated in the resistor is significant, being equal to the energy stored in the capacitor. Inductive current limiters avoid the power dissipation problem of a resistor, but are more susceptible to unwanted resonance effects, particularly with parasitic reactances. The transformers also represent a significant weight center, which is dominated by volt-second requirements.

HPM System

A high-powered microwave system includes a source, a feed & mode converter and an antenna. Two possible types of sources include the Magnetically Insulated Line Oscillator (MILO) and the Triaxial Relativistic Klystron Oscillator. Both of these systems have been demonstrated in single pulse operating systems. The MILO system does not use magnets but has a lower efficiency than the Klystron Oscillator, which does use magnets. The feed and antenna have been proposed to involve a waveguide and a slotted waveguide respectively.

Weapon System Requirements

Studies have been conducted by the Air Force Research Laboratory to determine the performance required by notional high-powered microwave emitter systems. These studies have defined parameters of the system based on the desired effectiveness. This study results in the system characteristics defined in Table 7.

TABLE 7

Power System Requirement

| Parameter | Value | Unit |
|---|---|---|
| Avg Input Power | 250 | kW |
| Charge Voltage | 30 | kV |
| Rep-Rate | 43 | Hz |
| Charge Time | 23 | Ms |
| Primary Capacitance | 12.3 | $\mu F$ |
| Number of Bursts | 5 | |
| Burst Length | 5 | sec |
| Time between Bursts | 30 | sec |

Projected System Capability of the Fabric Capacitor

Mission and Vehicle Parameters

To determine the approximate size of the capacitance that may be achieved in a fighter-type aircraft vehicle, a conceptual investigation of a perceived mission profile may be considered. This analysis seeks to determine the weight of an aircraft intended for a directed energy mission. This analysis is accomplished so that the approximate weight of the empty aircraft may be ascertained, from which the representative structural weight with the capacitive elements may be established. The mission defined involves a series of segments as are represented in FIG. 12 of the drawings.

A mission analysis may be accomplished in the manner outlined by Raymer in Reference [3]. The weight fraction for the mission analysis cruise segments are used in the Breguet range equation as shown in Equation 24, and the Endurance equation for the loiter weight fraction segment, shown in Equation 25.

$$R = \frac{V}{C}\frac{L}{D}\ln\frac{W_i}{W_{i+1}} \quad \text{Equation 24}$$

$$E = \frac{L/D}{C}\ln\frac{W_i}{W_{i+1}} \quad \text{Equation 25}$$

It may be assumed that the specific fuel consumption for a high bypass engine is 0.5 and 0.4 for cruise and loiter respectively. Additionally, the L/D ratio may be assumed to be 11 for this aircraft. Typically a 6 percent fuel allowance is added to provide for reserve and untapped fuel in the aircraft. Total fuel-volume fraction can then be estimated using Equation 26.

$$\frac{W_f}{W_0} = 1.06\left(1 - \frac{W_x}{W_0}\right) \quad \text{Equation 26}$$

Calculation of Take-Off Gross Weight (TOGW)

This analysis considers each of the mission segment weight fractions and iterates until convergence to determine the actual take off gross weight of the vehicle. The weight fractions for warm-up & take-off, climb and land of the mission are taken from historical design trends for an aircraft of this nature. The calculations are shown below in Table 8.

TABLE 8

Mission Segment Weight Fraction Calculations

| Mission Segment | Weight Fraction |
|---|---|
| Warm-up and Take-off | $w_1/w_0 = 0.9700$ |
| Climb | $w_2/w_1 = 0.9850$ |
| Cruise | R = 300 nm = 1,822,800 ft |
| | C = .5 l/hr = 0.0001389 l/s |
| | V = .6M × 994.8 ft/s = 596.9 ft/s |
| | L/D = (0.866)11 = 9.53 |
| | $w_3/w_2 = e^{(-RC/VL/D)} = 0.9565$ |

TABLE 8-continued

Mission Segment Weight Fraction Calculations

| Mission Segment | Weight Fraction |
|---|---|
| Loiter | E = 0.5 hr = 1800 sec |
|  | C = 0.40 l/hr = 0.0001111 l/s |
|  | L/D = 11 |
|  | $w_4/w_3 = e^{(-EC/L/D)} = 0.982$ |
| Climb | $w_5/w_4 = 0.9850$ |
| Cruise | $w_6/w_5 = 0.9565$ |
| Loiter | $w_7/w_6 = e^{(-EC/L/D)} = 0.9820$ |
| Land | $w_8/w_7 = 0.9950$ |

Solving for $W_8/W_0$:
$W_8/W_0 = (0.97)(0.985)(0.9565)(0.982)(0.985)(0.9565)(0.982)(0.995) = 0.8260$ Now solve for the fuel volume fraction using Equation 26:
$W_f/W_0 = 1.06(1-0.8260) = 0.1844$ The empty weight fraction can be calculated using a relationship derived from historical data, given by Reference 3 in Equation 27 for a jet fighter.

$$W_e/W_0 = 2.34(W_0^{-0.13}) \qquad \text{Equation 27}$$

The total weight of the vehicle is equivalent to the weight of the crew, payload, fuel plus the empty weight. By introducing fuel fraction and empty weight fraction into this relation a solution can be derived for the gross take-off weight, as shown in Equation 28.

$$W_0 = \frac{W_{crew} + W_{payload}}{1 - (W_f/W_o) - (W_e/W_o)} \qquad \text{Equation 28}$$

Figure 17:
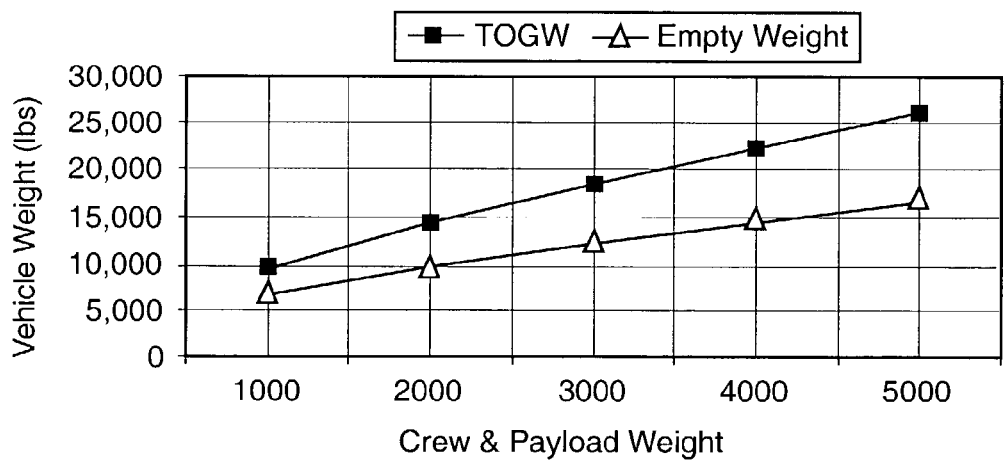
FIG. 17 shows a relationship between aircraft weight and payload plus crew weight.

Solving this equation iteratively for $W_0$, one can obtain a convergent solution for the take off gross weight. The results of this convergence assessment are shown below in Table 9 and in FIG. 17 of the drawings. The empty vehicle weights are also shown and are calculated using Equation 27.

TABLE 9

Vehicle Gross and Empty Weight Values

| Payload + Crew (lbs) | Gross Take off Weight (lbs) | Empty Vehicle Weight (lbs) |
|---|---|---|
| 1000 | 9,551 | 6,789 |
| 2000 | 14,226 | 9,602 |
| 3000 | 18,419 | 12,022 |
| 4000 | 22,340 | 14,221 |
| 5000 | 26,078 | 16,270 |

Table 9 shows the impact on the overall size of the vehicle as a function of the payload and crew weight. Notice that as the payload and crew weight increase, the empty vehicle weight as a percentage of TOGW becomes smaller. If a vehicle were to be unmanned the size of the vehicle would be significantly reduced. However, for the specific present purpose it is assumed that the vehicle will be a manned aircraft. Due to the physical size of a pilot it would be difficult to develop an aircraft below the 9,551 lb gross take-off weight estimate that could be flown, therefore this is assumed to the minimal size vehicle assessed. Since this vehicle will carry no/minimal weapon stores other than the high-powered microwave emitter system, a 1000 lb payload vehicle was selected for determining the approximate capacitance that could be achieved with the design concept. Nothing here should be understood to imply that the present invention is limited to use with a manned vehicle of a fighter size vehicle. The invention is in fact contemplated to be usable with flight vehicles of any size and shape including, for example the sharp-featured stealth aircraft, spacecraft, ships, tanks, automotive applications or any other types of movable or non-movable structures, systems or vehicles.

Aircraft Integration Concept

It is realized that integration of the present invention fabric capacitor into an airframe can present significant practical challenges. Such challenges are associated with developing an electrical bus arrangement, providing capacitor protection including access, achieving suitable mechanical fasteners for the structurally integrated capacitor skin material, preventing accidental capacitor intrusions and penetrations, and so-on. Preferably initial uses of the integrated structural capacitor should include uses on vehicle structures offering the simplest integration opportunity. One concept appearing to offer merit is to build a unitized-tubular structure of overall fuselage size that is largely bonded together in order to eliminate fuselage surface penetrations. The electrical bus may then be integrated into the end of the fuselage tubular structure making all the connections straightforward.

To estimate the amount of capacitance that may be achieved with the structurally integrated capacitor of the invention, an analysis of a fuselage application may be accomplished. It should be realized however, that different aircraft configurations may be practical and may include aircraft as flying wings that allow integrating the capacitive structure into the wing carry-through surface or spacecraft or other vehicles.

Fuselage Weight Estimation

To estimate the weight of a fuselage for a 9,551 lb take-off gross weight vehicle a simple weight estimating methodology can be used. This method was developed for conventional metal aircraft in the past. (Reference 3). The method is directed at moderate subsonic to supersonic aircraft performance and is based on US Air Force aircraft. The method has developed a simple formula for the estimate of the fuselage weight. This formula is shown below in Equation 29.

$$FsWt(lbs) = 0.499(K_{dwf})(W_{dg})^{0.35}(N_z)^{0.25}(L)^{0.5}(D)^{0.849}(W)^{0.685} \qquad \text{Equation 29}$$

The equation 29 constants are defined as follows in Table 9:

TABLE 10

Values for Fuselage Weight Estimate

| $k_{dwf}$, Delta Wing = 0.774 otherwise = 1.0 | 0.774 |
|---|---|
| Fuselage Length - L (ft) | 33.2 |
| Fuselage Depth - D (ft) | 6.6 |
| Fuselage Width - W (ft) | 6.6 |
| Design Gross Weight - $W_{dg}$ (lbs) | 8846 |
| Ultimate Load factor - 1.5 × limit load factor | 13.5 |

For a jet fighter the fuselage length may be estimated using a relationship based on aircraft trends; presented in Reference 3, and provides adequate accuracy. This relationship is given by Equation 30 and is based on historical aircraft characteristics.

$$\text{FuselageLength} = 0.93(W_{TO})^{0.39} \qquad \text{Equation 30}$$

Evaluating this relation we find for an aircraft with a take off weight of 9,551 lbs that the estimated fuselage length is 33.2 feet.

The minimum drag on a subsonic fuselage is achieved when the slenderness ratio D/L is approximately 0.33. However, this yields a diameter of over 11 feet; which is not acceptable. Since, the drag characteristics are relatively flat for subsonic aircraft between slenderness ratios of 0.2-0.4, a ratio of 0.2 will be selected. This yields a diameter of 6.6 feet, which will be used as the maximum depth and height in the above analysis. Using these values in the above relation, the fuselage weight estimate can be calculated.

Fuselage weight=1,855 lbs.

This assessment is again largely based on historical data for fighter aircraft. Since the database is limited or nonexistent for fighter aircraft in the 10,000 lb class, the equations used are extrapolated. This possibly represents an error source in our weight estimates, but the energy storage calculations in the following discussion can be applied to higher fidelity models as they become available for directed energy vehicles.

Fuselage Capacitance

This analysis uses the results of the fabric test capacitor extrapolated to 50% capacitor fiber to project a value of capacitance per unit volume of material used. It must be recognized that this value represents a non-optimized capacitor design but will provide a conservative estimate of what can be achieved. Additionally, assuming the same strain to failure between the aluminum and textile structure also introduces some error. Generally, the design strain levels of aluminum aircraft structure are established based on fatigue characteristics of the material. In the case of the textile structure a more efficient design may be possible due to less sensitivity to fatigue. Since the mechanical properties of the textile fabric capacitor have not been characterized it is necessary to presume a similar strain to failure relationship, a relationship that is consistent with our conceptual estimation of performance.

Using the results from the fabric experimental investigation, the capacitance per volume may be calculated. This yields a value of 5.2557 nanofarads per cubic inch of material for the 50% tow capacitor case. An aluminum aircraft with a fuselage weight of 1,855 lbs. will yield an approximate volume of 18,366 cubic inches of material. Adjusting the lower stiffness levels of the 50% capacitor textile, by a factor of 75% yields a value of 32,140 cubic inches of material. Multiplying by the capacitance per unit volume, gives a total capacitance value of 168.92 microfarads.

Considering that the textile capacitor has a significantly different density than aluminum it is important to note that this volume of material will equate to a different overall fuselage weight. By using the density of the textile capacitor and the calculated representative volume, a new fuselage weight can be calculated. This value can then be used to refine the overall conceptual design of the vehicle.

With respect to thus-far achieved embodiments of the invention and alternate embodiments possible, the achieved fuselage capacitance estimate of 168.92 microfarads exceeds the earlier identified requirement of only 12.3 microfarads by a notable margin. The fabric capacitor test sample demonstrated voltage break-down down at 251 volts on a single wire, therefore, to obtain the total energy required by the system a dielectric material with greater voltage breakdown strength and thicker coating should be considered. In addition capacitor wires may be connected in series or the output tailored with the use of a Marx Bank circuit. A modular approach to capacitor arrangement may be taken with connection of the structural wires by various series/parallel combinations to achieve the desired output for a number of applications on board an aircraft or spacecraft. Simply by flipping a switch, one could line up connections needed to supply sufficient power to the weapon load. One particular module may be used to run the weapons load, with other modules available for back up as required. With enough energy available for the weapons system, other present invention capacitor modules tied off from the structure itself could be used to energize communications, or sensors, and operate housekeeping electronics, etc. within the aircraft. The energy levels may be arranged to remain in a near constantly charged state while the aircraft is in flight due to onboard generators or the capture of static charging from the air friction.

To reduce the electrical inductance occurring in the structurally integrated capacitor fabric it appears beneficial to coat the capacitor wire with an insulating material. This reduces the stiffness of the structure but the additional thickness required to improve electrical performance is small. This change also provides isolation of the capacitors from functional aspects of the aircraft. An improved outer conductor-coating scheme may be used also to improve capacitor efficiency. Such a coating may be achieved by drawing the dielectric coated central conductor through a conductive ink or epoxy having improved electrical properties. The dielectric materials identified herein may be improved-upon by employing emerging materials such as fluorene polyester. As the electrical performance of the dielectric improves, the voltage capability of the capacitor can be increased thereby allowing even more energy storage capacity within the airframe.

Mechanical properties testing of the textile fabric of the structurally integrated capacitor can provide insight into the accuracy of the TEXCAD estimates. Such testing will also yield appropriate strain to failure values for the structure. It is also desirable to perform an improved TEXCAD analysis where the "straightness" of the capacitor elements is modeled, since the employed model assumes an undulation pattern is developed during the weaving process. In addition, the projected capacitance of the fuselage structure used herein is based on estimates of the aircraft configuration. This analysis can be further refined as the mission and vehicle performance characteristics associated with the structurally integrated capacitor become better defined.

A conventional aircraft equipped to carry 3000 pounds of conventional parasitic capacitor will result in a vehicle take-off gross weight of about 18,419 pounds. A vehicle configured with the present invention technology and carrying only 1000 pounds of payload to perform the same mission will however achieve an improved overall take-off gross weight of only about half of this weight, i.e., a weight of about 9,551 pounds. This is not surprising due to the tremendous gross weight growth factor associated with air vehicles, i.e., as payload increases so also does the required amount of aerodynamic lift, engine thrust, and fuel.

While the apparatus and method herein described constitute a preferred embodiment of the invention, it is to be understood that the invention is not limited to this precise form of apparatus or method and that changes may be made therein without departing from the scope of the invention as is defined in the appended claims.

REFERENCES

Hereby Incorporated by Reference Herein

1. Fitzgerald A. E., et al, "Basic Electrical Engineering," fifth edition, 1981.
2. Bueche, Frederick, "Introduction to Physics," 1975.
3. Fiore, Richard, "ESR Losses in Ceramic Capacitors," Application Note, American Technical Ceramics, Printed in Microwave Product Digest, September 1999.
4. Naik Rajiv A., "Failure Analysis of Woven and Braided Fabric Reinforced Composites," NASA Contractor Report 194981, September 1994.
5. Naik Rajiv A., "Analysis of Woven and Braided Fabric Reinforced Composites," NASA Contractor Report 194930, June 1994.
6. Naik Rajiv, A., "TEXCAD-Textile Composite Analysis for Design," Version 1.0 User's Manual, NASA Contractor Report 4639, December 1994.
7. Lebacqz J. V., "Pulse Generators," Dover, N.Y., 1948.
8. Raymer Daniel P., "Aircraft Design: A Conceptual Approach," AIAA Education Series, 1989.

We claim:

1. The weight conserving and space conserving method of capacitively storing electrical energy within the enclosure of an aircraft airframe, said method comprising the steps of:
    fabricating substantial portions of said airframe from structural materials comprised of intimately spaced electrically isolated and electrical capacitance-comprising first and second electrical conductors disposed in a woven fabric;
    connecting a plurality of said first electrical conductors to a first common electrical node;
    joining a plurality of said second electrical conductors to a second common electrical node;
    disposing an electrical capacitance charging electrical potential between said first and second electrical nodes at a capacitor charging rate.

2. The weight conserving and space conserving method of capacitively storing electrical energy within the enclosure of an aircraft airframe of claim 1 further including the step of fabricating said structural materials as a woven fabric matrix of carbonaceous fibers.

3. The weight conserving and space conserving method of capacitively storing electrical energy within the enclosure of an aircraft airframe of claim 2 further including the step of dispersing a plurality of concentrically disposed electrical conductor pair electrical capacitor elements in said fabric matrix of carbonaceous fibers.

4. The weight conserving and space conserving method of capacitively storing electrical energy within the enclosure of an aircraft airframe of claim 2 further including the step of dispersing said plurality of concentrically disposed electrical conductor pair electrical capacitor elements along one of a warp axis and a weave axis of said fabric matrix of carbonaceous fibers.

5. The weight conserving and space conserving method of capacitively storing electrical energy within the enclosure of an aircraft airframe of claim 1 further including the step of withdrawing electrical energy accompanying said electrical potential from an electrical capacitance comprised of said node connected and node joined intimately spaced electrically isolated and electrical capacitance-comprising first and second electrical conductors during a repetitive cycle of capacitance charging and discharging events.

6. The weight conserving and space conserving method of capacitively storing electrical energy within the enclosure of an aircraft airframe of claim 1 wherein said aircraft is a military aircraft and said repetitive cycle of capacitance charging and discharging events comprise a firing and re-energizing cycle of a directed energy weapon carried by said aircraft.

7. The weight conserving and space conserving method of capacitively storing electrical energy within the enclosure of an aircraft airframe of claim 1 wherein said aircraft airframe comprises one of an atmospheric supported winged aircraft, a spacecraft, and a watercraft.

8. The weight conserving and space conserving method of capacitively storing electrical energy within the enclosure of an aircraft airframe of claim 1 further including the step of:
    removing said stored electrical energy from said charged electrical capacitance at a rate faster than said capacitor charging rate.

9. The weight conserving and space conserving method of capacitively storing electrical energy within the enclosure of an aircraft airframe of claim 8 further including the step of continuing said charging and removing events in a repeating energy dissipating cycle.

10. The weight conserving and space conserving method of capacitively storing electrical energy within the enclosure of an aircraft airframe of claim 1 wherein said step of fabricating substantial portions of said airframe from structural materials comprised of intimately spaced electrically isolated and electrical capacitance-comprising first and second electrical conductors disposed in a woven fabric includes one of:
    bonding a metal foil to a dielectric coated wire, electroless plating a dielectric coated wire, flame spraying a metal coating over a dielectric coated wire and dispersing, by one of spray, vapor deposit and painting, a metal coating over a dielectric coated wire.

11. The weight conserving and space conserving method of capacitively storing electrical energy within the enclosure of an aircraft airframe of claim 1 wherein said step of fabricating substantial portions of said airframe from structural materials comprised of intimately spaced electrically isolated and electrical capacitance-comprising first and second electrical conductors disposed in a woven fabric includes one of:
    sputtering, sol gel depositing, spraying, vapor depositing and extruding a metallic coating over an elongated dielectric covered electrical conductor.

* * * * *